United States Patent [19]

Strosser

[11] Patent Number: 4,630,191
[45] Date of Patent: Dec. 16, 1986

[54] AUTOMATIC BALER WITH OPERATOR CONTROLLED DIAGNOSTICS

[75] Inventor: Richard P. Strosser, Akron, Pa.

[73] Assignee: New Holland, Inc., New Holland, Pa.

[21] Appl. No.: 599,908

[22] Filed: Apr. 13, 1984

[51] Int. Cl.$^4$ ............................................ G06F 11/00
[52] U.S. Cl. ..................................... 364/186; 371/17;
371/29
[58] Field of Search ..................... 364/186; 371/17, 29

[56] References Cited

U.S. PATENT DOCUMENTS

| | | | |
|---|---|---|---|
| 3,928,830 | 12/1975 | Bellamy | 371/29 |
| 3,953,717 | 4/1976 | Rottier et al. | 371/17 |
| 4,200,224 | 4/1980 | Flint | 371/29 |
| 4,219,039 | 4/1981 | Baker | 364/519 |
| 4,277,833 | 7/1981 | Steffen | 371/29 |
| 4,292,666 | 9/1981 | Hill | 364/900 |
| 4,353,653 | 10/1982 | Zimmerman | 364/900 |
| 4,459,695 | 7/1984 | Barratt | 371/29 |
| 4,497,057 | 1/1985 | Kato | 371/29 |
| 4,535,456 | 8/1985 | Bauer et al. | 371/16 |
| 4,550,247 | 10/1985 | Winter | 364/900 |

FOREIGN PATENT DOCUMENTS

| | | | |
|---|---|---|---|
| 54-55142 | 5/1979 | Japan | 371/29 |
| 106359 | 8/1980 | Japan | 371/29 |
| 2036507 | 6/1980 | United Kingdom | 371/29 |

OTHER PUBLICATIONS

Diagnostic Error Display; Crandall et al; IBM Technical Disclosure Bulletin; vol. 19, No. 8, Jan. 1977.

Primary Examiner—Charles E. Atkinson
Assistant Examiner—Allen MacDonald
Attorney, Agent, or Firm—Griffin, Branigan, & Butler

[57] ABSTRACT

An automatic round or roll baler control system includes a microprocessor controlled signal processing circuit responsive to signals derived from various switches for controlling the wrapping of a bale and signalling to the operator the status of the baler. A diagnostic program may be initiated by the operator from a control panel. An operator's manual of instruction leads the operator through successive test steps such as, for example, actuating switches, and the signal processor visually and audibly signals the operator as to whether or not the test step was successful.

14 Claims, 25 Drawing Figures

Microfiche Appendix Included
(1 Microfiche, 49 Pages)

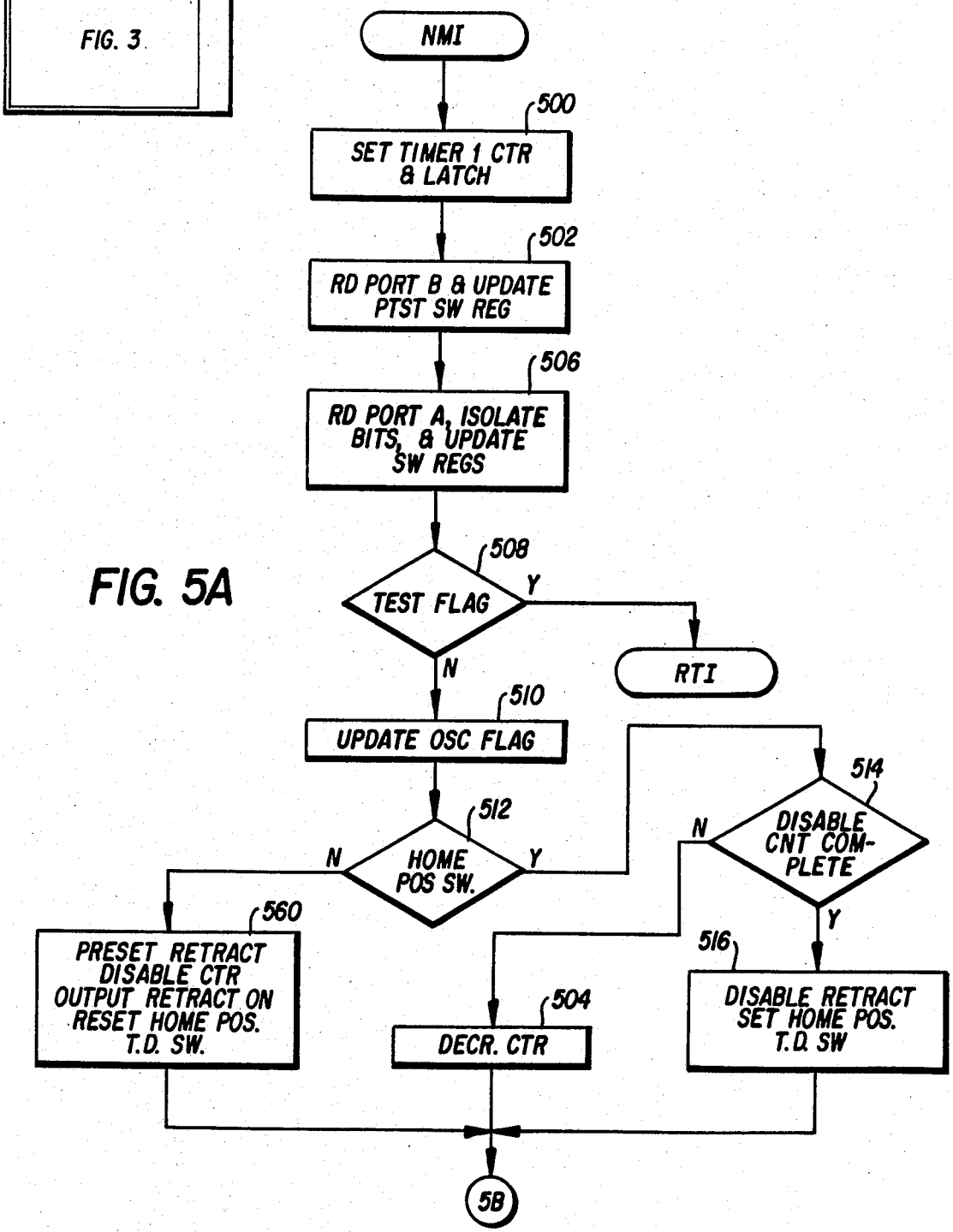

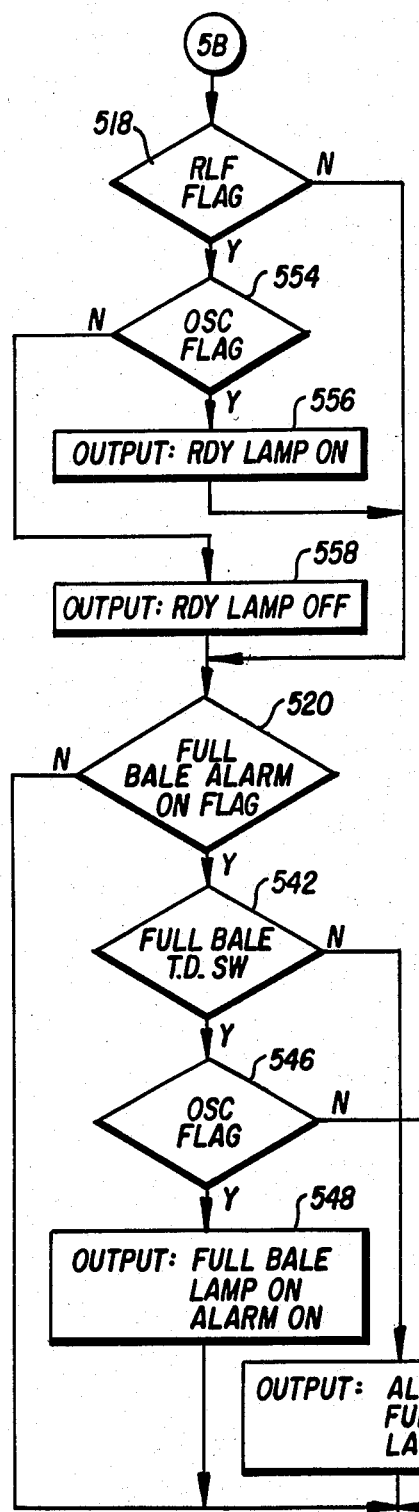
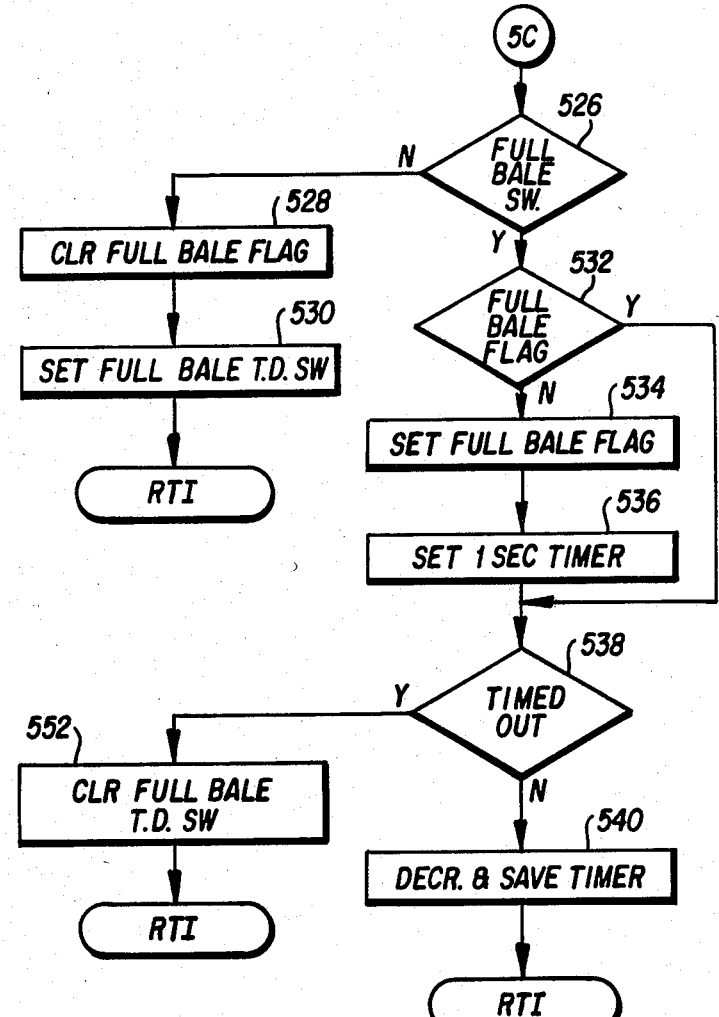
FIG. 5C
FIG. 5B

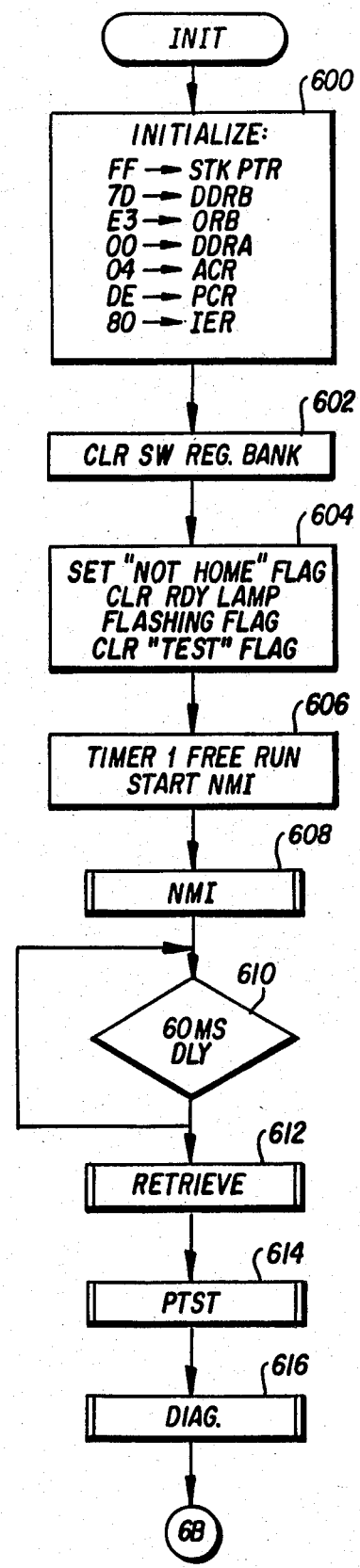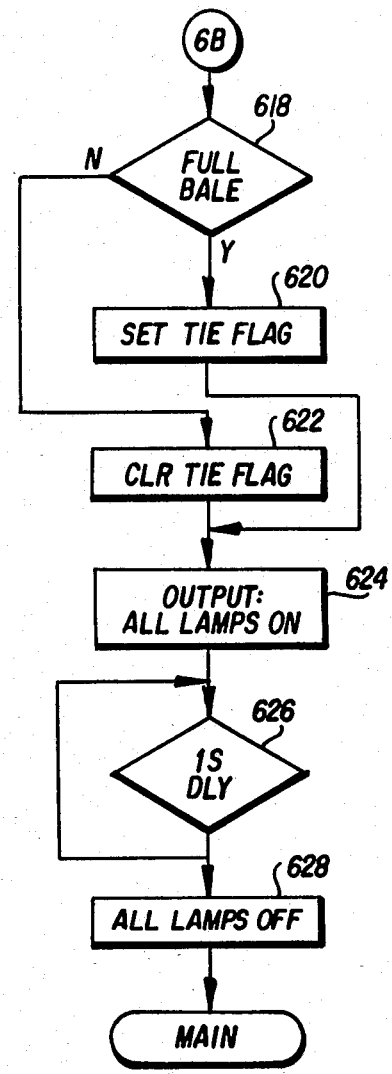
FIG. 6A
FIG. 6B

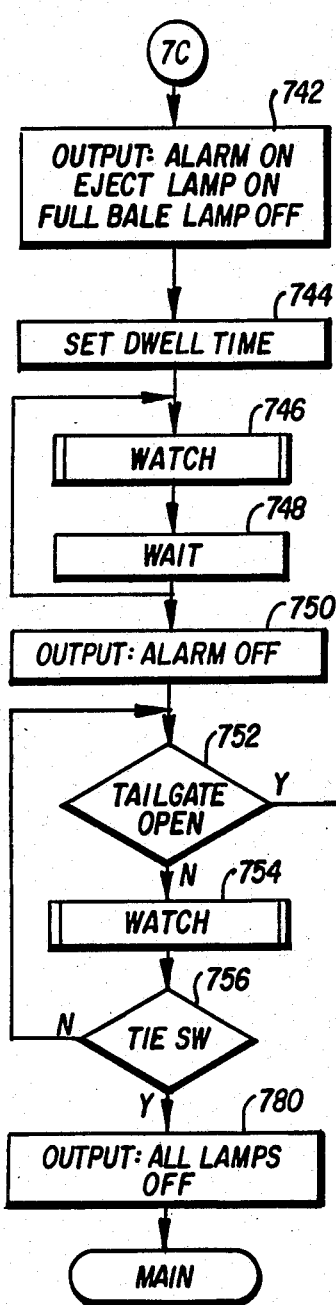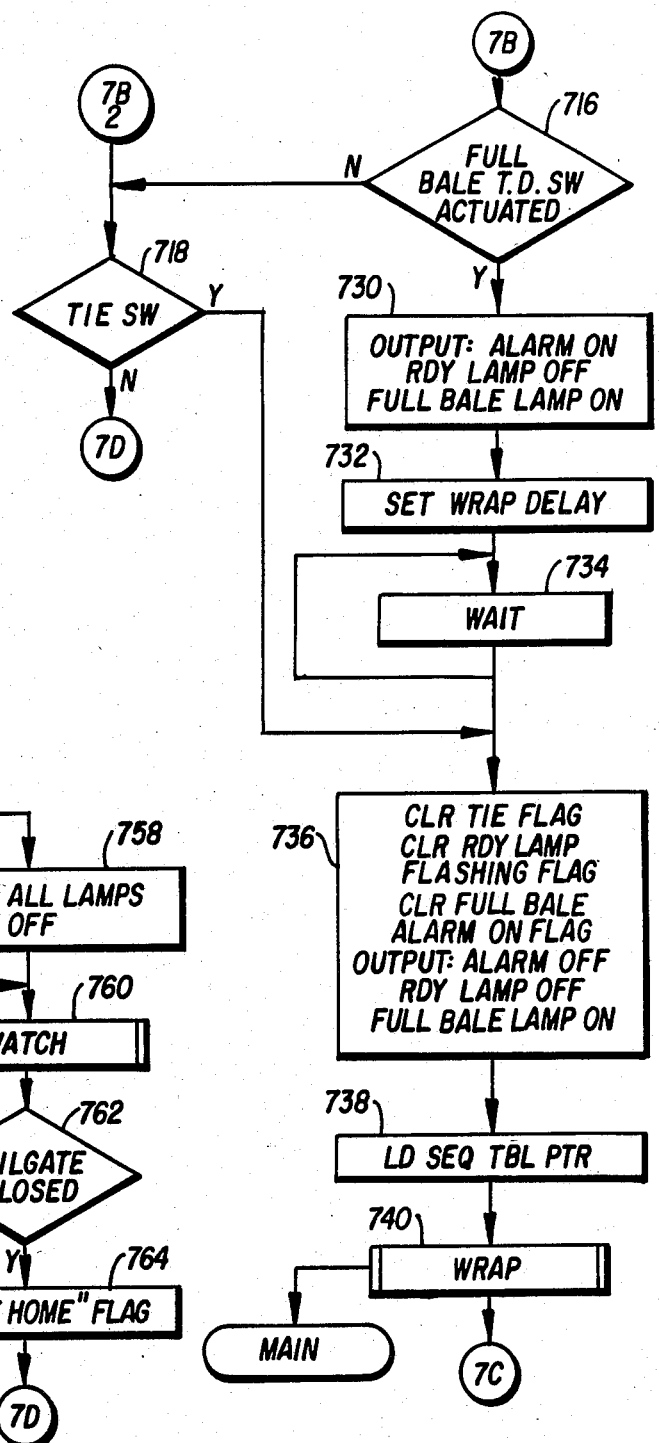
FIG. 7C
FIG. 7B

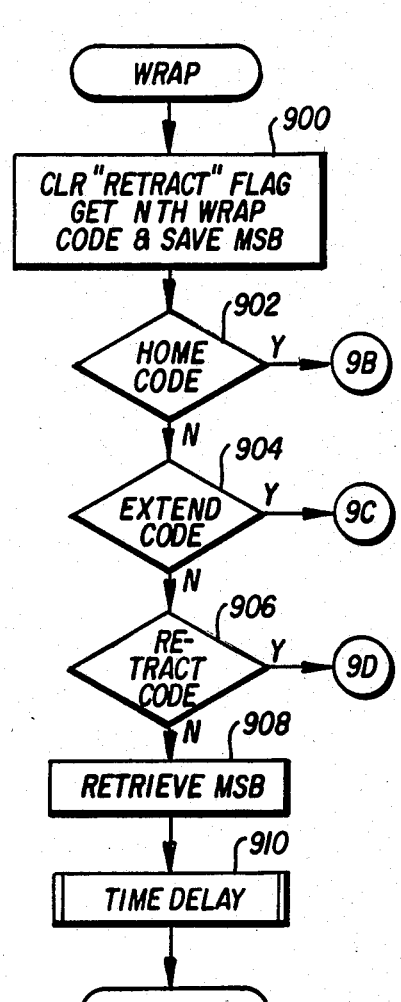
FIG. 9A
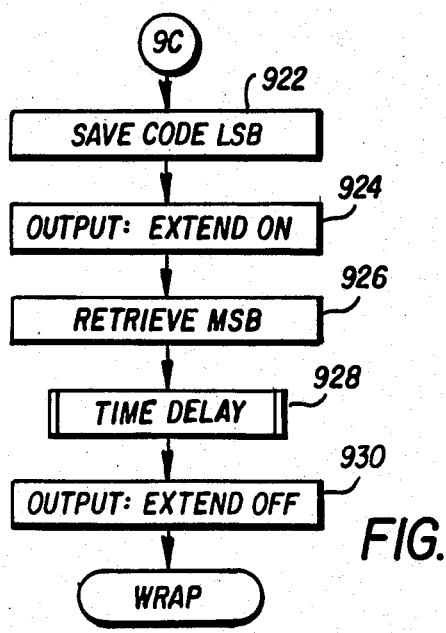
FIG. 9C
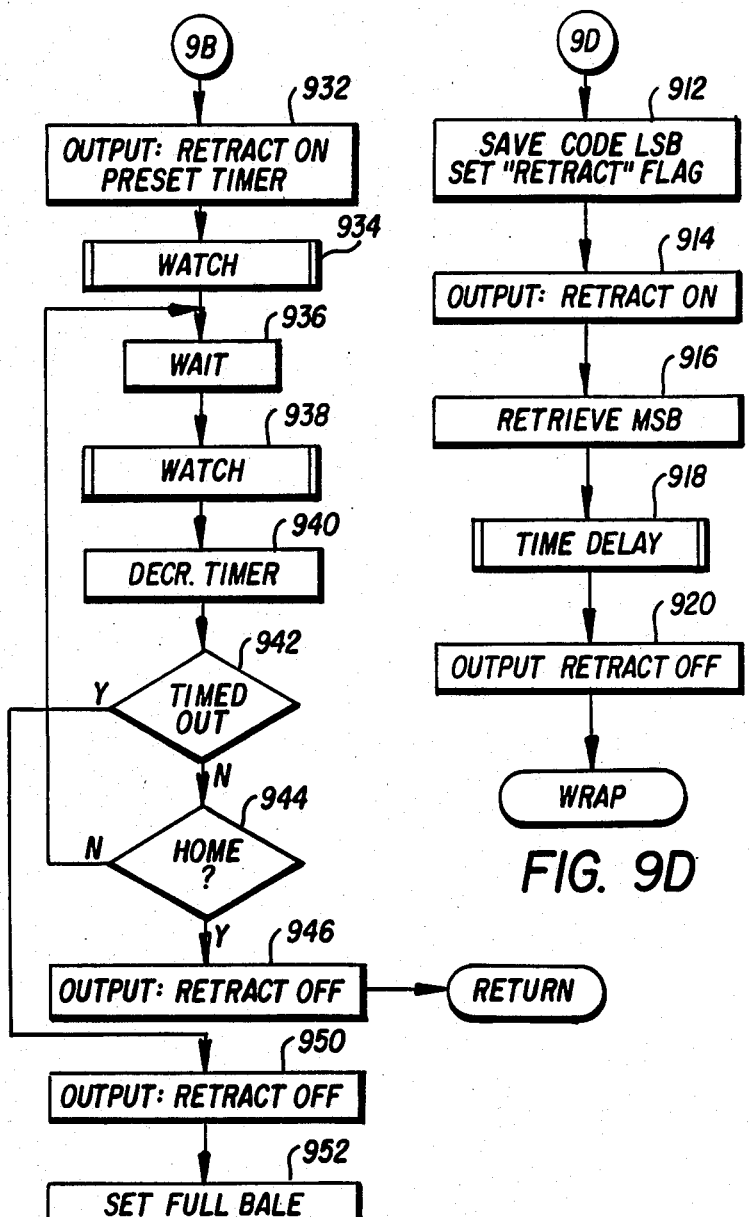
FIG. 9B
FIG. 9D

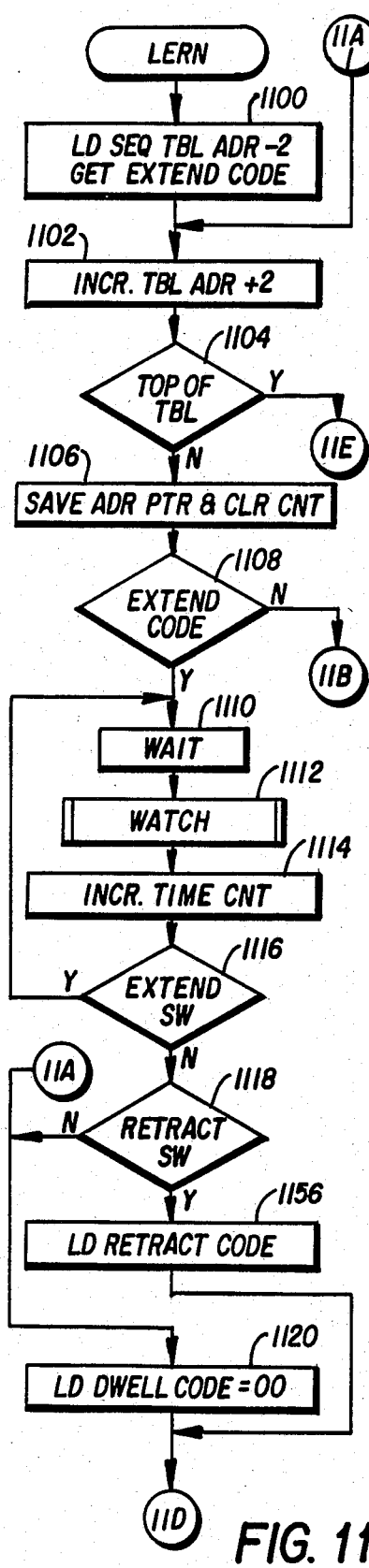
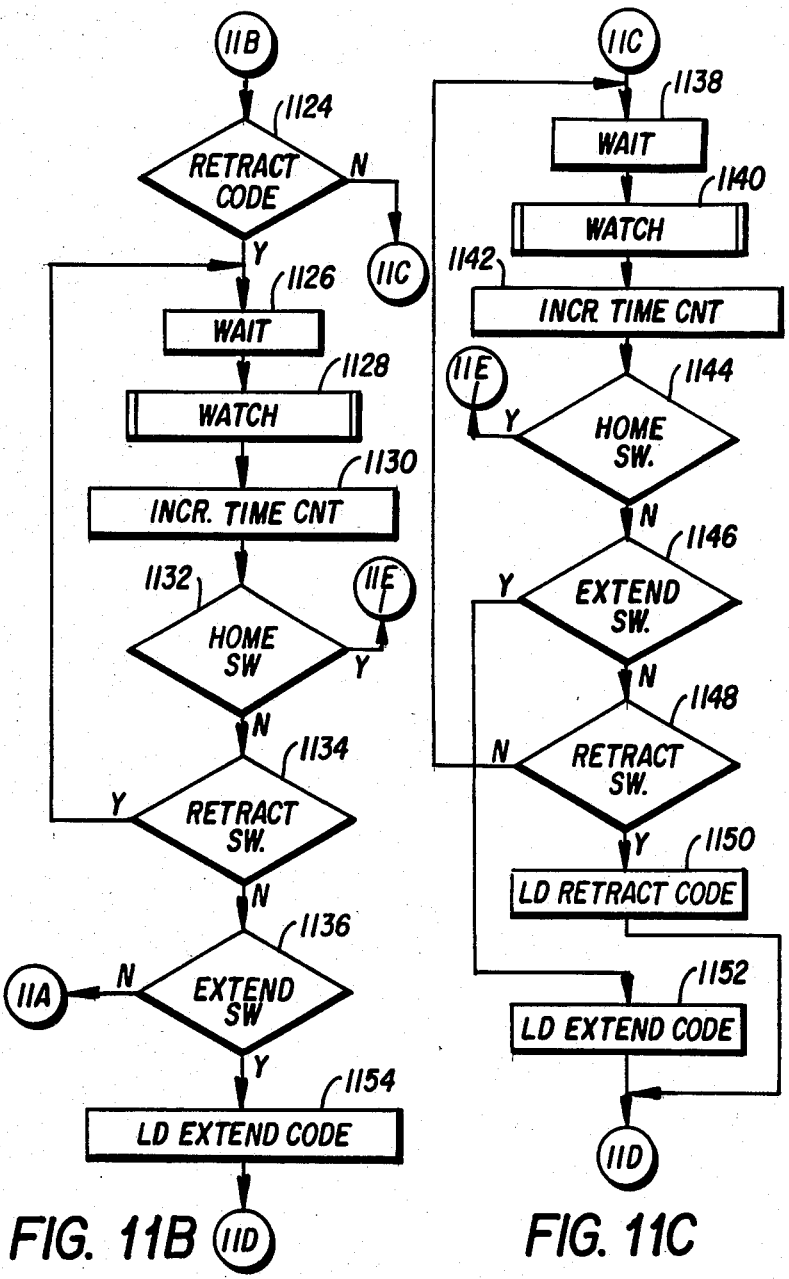
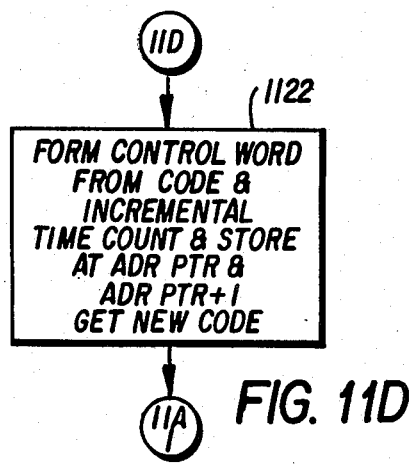
FIG. 11A
FIG. 11B
FIG. 11C
FIG. 11D

AUTOMATIC BALER WITH OPERATOR CONTROLLED DIAGNOSTICS

The present application includes a microfiche appendix of 49 frames.

BACKGROUND OF THE INVENTION

The present invention relates to round or roll baling machines of the type disclosed in Blanshine et al. U.S. Pat. No. 4,026,205. More particularly, the present invention relates to a diagnostic control means for locating the source of trouble in a microprocessor controlled system which controls a baler of the type shown in the Blanshine et al. patent.

The patent to Blanshine et al. discloses a crop baling machine which is pulled by a tractor along a windrow, the crop being picked up by the baling machine and formed into a round bale. As disclosed in U.S. Pat. No. 4,253,389 the baling machine may be provided with an apparatus for "wrapping" the formed bale with twine so that it will remain firm and compact after it is ejected from the baler. After the bale has been wrapped it is ejected from the baling machine by opening a tailgate which permits the wrapped bale to fall to the ground at the rear of the baler.

Recent improvements to roll forming baling machines include microprocessor-based control systems for controlling some or all of the steps of the baling operation. In these improvements a signal processing system is responsive to various input signals for controlling operations of the baler and signalling the operator as to the status of the baling operation. Where the baler is not fully automatic the signalling of the operator may be accomplished by energizing audible or visual indicators which prompt the operator as to what he should do next. The input signals to the microprocessor are derived from switches which are either manually actuated by the operator or actuated by movement of various parts of the baler.

Because of the conditions to which the baler is subjected, e.g. rough terrain, inclement weather, dust, etc., various elements of the system may fail. Some of these failures could be easily repaired by the operator if he knew which part was not working properly, even though the operator may not be skilled in electronics. Since the baler control systems presently known do not include a means for assisting an operator in locating the source of a problem, an operator must either wait for a repair man or take his baling machine to a service center when a problem develops.

SUMMARY OF THE INVENTION

An object of the present invention is to provide a diagnostic tool by means of which a bale forming machine operator with only limited electronic skills may locate the source of a problem.

An object of the present invention is to provide a signal processing circuit for a baling machine, the signal processing circuit including a memory for storing a diagnostic routine which is called into operation by the operator when he wishes to determine what part is causing a malfunction of the baler.

A further object of the invention is to provide a signal processing circuit as described above which selectively actuates visual and/or audible indicators as the operator performs the sequential steps of a test procedure to thereby signal the success or failure of each step.

The above stated and other objects of the invention are accomplished by providing a microprocessor, memory means and an interface adapter for interfacing the microprocessor with a plurality of input switches and a plurality of output indicators. The memory stores a diagnostic program which is executed by the microprocessor only when the operator actuates a particular switch at the time he turns on a power on/off switch. The operator is supplied with an operator's manual which gives him step-by-step instructions for a test procedure. As each instruction is carried out by the operator to apply a signal to the microprocessor, the microprocessor selectively actuates an indicator to indicate if the test step was successfully completed. In this way the operator determines the cause of a system failure and may repair or replace the defective part.

BRIEF DESCRIPTION OF THE DRAWINGS

FIGS. 5A-5C comprise a flow diagram illustrating the Non-Maskable Interrupt Routine;

FIGS. 6A and 6B comprise a flow diagram illustrating the Initialize Routine;

FIGS. 7A-7D comprise a flow diagram illustrating the Main/Routine;

FIGS. 9A-9D comprise a flow diagram illustrating the Wrap Routine;

FIGS. 11A-11E comprise a flow diagram illustrating the Learn Routine.

DESCRIPTION OF A PREFERRED EMBODIMENT

Figure 1:
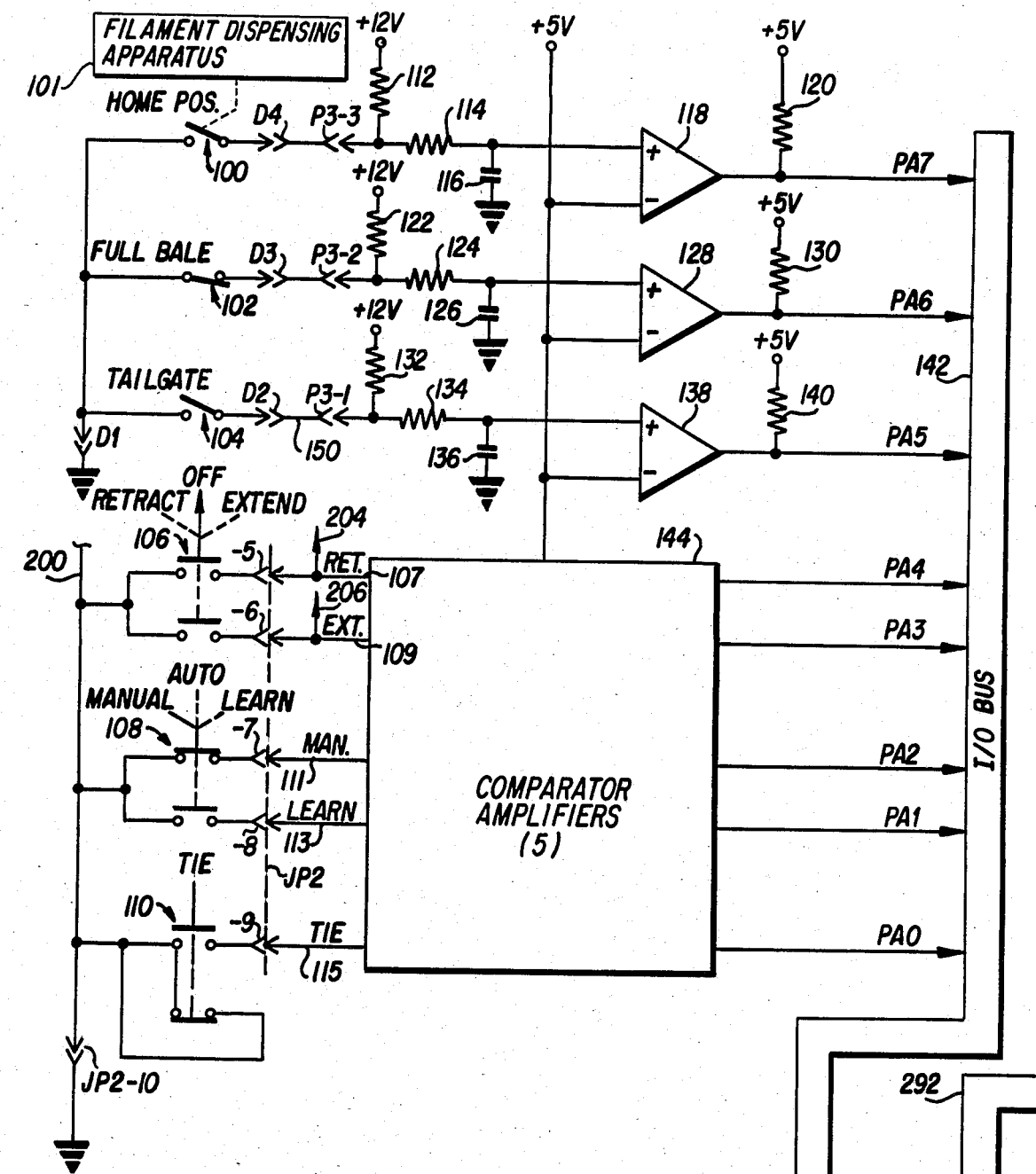
FIGS. 1-3, when arranged as shown in FIG. 4, comprise a wiring diagram of the invention.
Figure 2:
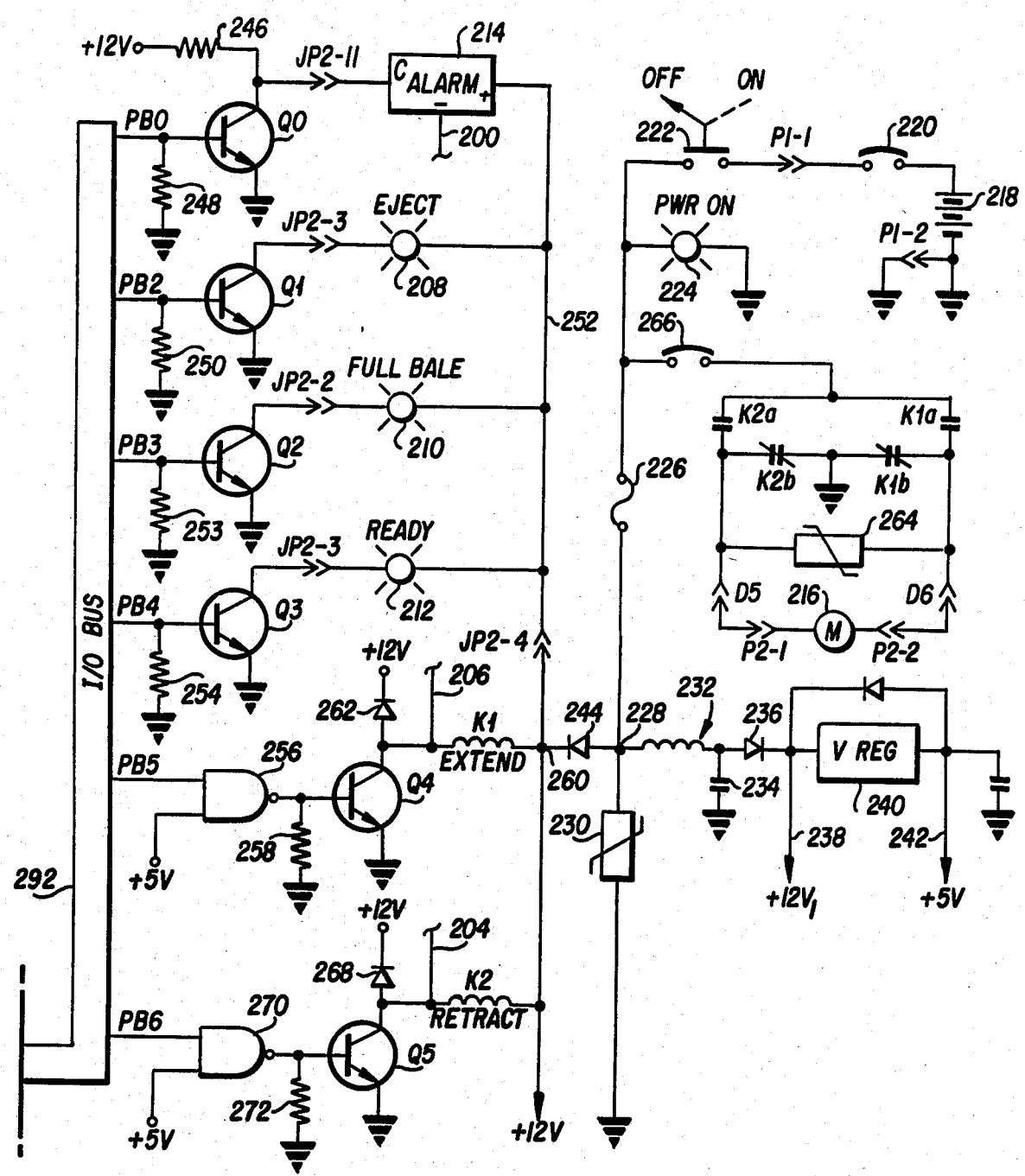
Figure 3:
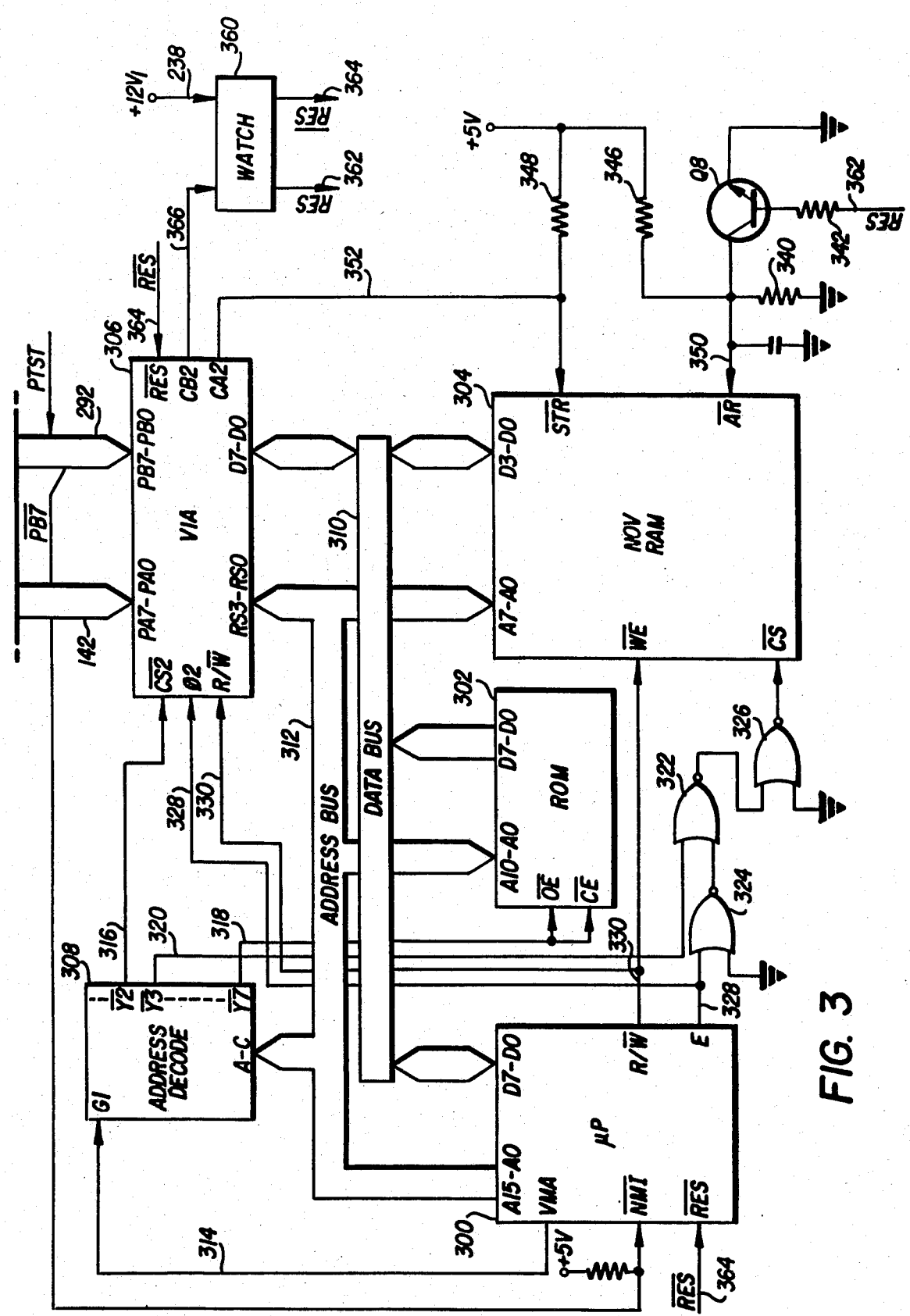

FIGS. 1-3, when arranged as shown in FIG. 4, comprise a circuit diagram of an electronic control system for controlling a round or roll baler of the shown in U.S. Pat. No. 4,026,205 having a bale wrapping mechanism of the type disclosed in U.S. Pat. No. 4,253,389. The electronic control circuit comprises an input means (FIG. 1), an output means (FIG. 2) and a signal processing means (FIG. 3) responsive to the input means for controlling the output means.

The input means comprises a home position switch 100, a full bale switch 102, a tailgate switch 104, a retract/extend switch 106, a program select switch 108 and a tie switch 110. Switches 106, 108 and 110 are located on an operator's control panel. For a tractor-pulled baler the control panel is mounted on the tractor within reach of the driver.

The home position switch 100 is a normally open switch which is closed when the twine tubes of the wrapping apparatus are in the home position. The home position switch may be a Hall effect switch which is operated by a magnet attached to some portion of the mechanism which drives the twine tubes. One side of the home position switch 100 is connected through a connector contact D-1 to signal ground and at the other side the switch is connected through connector contacts D-4 and P3-3 to a pair of resistors 112 and 114. Resistor 112 is connected to +12 V while resistor 114 is connected to the non-inverting input of a comparator amplifier 118. A capacitor 116 is connected between signal ground and the input to a comparator amplifier 118. The output of comparator amplifier 118 is tied through a resistor 120 to +5 V. The output of the amplifier is the signal PA7 and it is connected to bit 7 of an I/O bus 142. The inverting input of comparator amplifier 118 is connected to +5 V. As long as the home position switch 100 is open (i.e. twine tubes not in home position) +12 V is available at the non-inverting input of amplifier 118 and the output signal PA7 is logic 1. When the twine tubes are in the home position to close switch 100 then the non-inverting input of amplifier 118 is connected to ground and the amplifier output signal PA7 is logic 0.

Baling machines of the type illustrated in Blanshine et al., U.S. Pat. No. 4,026,205 include an upper apron which expands as a bale is being formed. The full bale switch 102 may be a Hall effect sensor which is mounted on the baler so that it is activated (closed) when the upper apron has expanded to the position it occupies when a full bale has been formed. The full bale switch 102 is connected at one side to signal ground and at the other side is connected to comparator 128. Comparator amplifier 128 responds to operation of the full bale switch 102 in the same manner that comparator amplifier 118 responds to the home position switch 100. The output signal PA6 of comparator 128 is applied to bit position 6 of I/O bus 142 and is logic 0 when a full bale allows closure of the switch 102.

The bale forming machine described in U.S. Pat. No. 4,026,205 has a tailgate which is raised in order to eject a bale from the baling machine once it has been rolled and wrapped or tied. The tailgate switch 104 may be a Hall effect device which senses the position of the tailgate and is operated (opened) when the tailgate is opened. The tailgate switch 104 is connected at one side to ground and at the other side to a comparator 138. As long as switch 104 is closed the output signal PA5 from comparator 138 is logic 0. The signal PA5 goes to logic 1 when the tailgate switch 104 is opened (tailgate opened).

The switches 100, 102 and 104 may also be microswitches which are mechanically actuated by movements of the twine tube drive mechanism, the upper apron, and the tailgate, respectively.

The retract/extend switch 106 is a manually operated switch located on the control panel near the operator of the tractor which pulls the baler. Switch 106 is a three-position switch having two sets of contacts. When the switch is in the "off" position none of the contacts are closed. When the switch is in the "retract" position a first set of contacts is closed to connect lead 107 through a connector JP2-5, the switch contacts, and a connector JP2-10 to signal ground. The lead 107 is connected to a comparator amplifier circuit which is exactly the same as the comparator amplifier circuit controlled by the home position switch 100. The reference numeral 144 designates five such comparator amplifier circuits which are responsive to output signals from the switches 106, 108 and 110. When switch 106 is in the retract position one of the comparator amplifier circuits 144 produces the logic 0 signal PA4 which is applied to position 4 of the I/O bus 142.

When switch 106 is in the "extend" position a second set of contacts connects a lead 109 through a connector JP2-6, the switch contacts and connector JP2-10 to signal ground. Lead 109 is connected to a comparator amplifier circuit within block 144 and when the switch is in the extend position the comparator circuit produces the logic 0 signal PA3 which is applied to bus 142.

The switch 106 may be selectively actuated by the operator as subsequently described to extend or retract the twine tubes of the bale wrapping mechanism if there should be a failure of the signal processing circuits of FIG. 3. The switch 106 is also utilized to generate a bale wrapping program when the switch 108 is set to the "learn" position.

Switch 108 is also a three-position manually operated switch. The switch has two sets of contacts both of which are connected through connector JP2-10 to signal ground. When the switch is in the "automatic" position neither set of contacts is closed and the baling machine will automatically form and wrap a full bale and signal the operator when he should eject a bale or begin forward movement of the baler to form a new bale. When the switch is in the "manual" position a lead 111 is connected through the first set of contacts to signal ground. The lead 111 is connected to a comparator amplifier circuit within block 144 and this circuit produces the signal PA2 which is applied to bit position 2 of the I/O bus when the switch is closed.

When switch 108 is in the "learn" position the second set of contacts connects a lead 113 to signal ground. When the switch is in this position the operator may store a bale wrapping sequence or program which may then be executed automatically when the switch 108 is moved to the automatic position. The lead 113 is connected to a comparator amplifier circuit within block 144 and this circuit produces the signal PA1 which is applied to the bus 142 when the switch is closed.

The tie switch 110 is a pushbutton switch located on the operator's control panel. It has a set of contacts connected at one side through connector JP2-10 to signal ground and at the other side to a lead 115. The lead 115 is connected to a comparator amplifier circuit within block 144 and this circuit produces the signal PA0 when the tie switch 110 is actuated to close its contacts. The tie switch is utilized by the operator to initiate a bale-wrapping cycle under certain conditions.

As illustrated in FIG. 2, the output means comprises an eject lamp 208, a full bale lamp 210, a ready lamp 212, an audible alarm 214 and two relays K1 and K2 for controlling a bidirectional linear motor 216.

FIG. 2 also shows the power distribution for the electronic control circuit. Power is derived from a battery 218 which may be the 12V battery for the ignition circuit of the tractor which pulls the baler. The negative side of the battery is connected to power supply ground and through a connector P1-2 to signal ground. The positive side of the battery is connected through a 30 amp circuit breaker 220 and a connector P1-1 to one side of a power on/off switch 222. The other side of the switch 222 is connected through a "power on" lamp 224 to signal ground so that the lamp 224 is turned on when switch 222 is turned on to supply power to the circuit. The switch 222 is also connected through a fuse 226 to a junction 228. Junction 228 is connected through a varistor 230 to signal ground. The junction 228 is also connected through a filter circuit 232 and a diode 234 to a junction 236. From junction 236 the filtered voltage +12 $V_1$ is distributed over a lead 238 to the circuit 360 shown in FIG. 3. The voltage at junction 236 is also applied to a voltage regulator 240 which provides a +5 V output voltage on lead 242 which is distributed throughout the circuit.

The junction 228 is connected through a diode 244 to one side of relays K1 and K2 and through connector JP2-4 to one side of the lamps 208, 210 and 212 and the audible alarm 214.

Alarm 214 is connected to signal ground by a lead 200 and connector JP2-10 (FIG. 1). The alarm 214 has a control input terminal C which is connected through a connector JP2-11 to the junction between a resistor 246 and the collector of a transistor Q0. The emitter of transistor Q0 is connected to signal ground while the base is connected to bit position 0 of the I/O bus 292 and through a resistor 248 to ground.

Transistor Q0 is normally on so that ground is applied to the control input of the alarm. When the signal PB0 goes to logic 0 the transistor Q0 is blocked so that the control input of alarm 214 is at +12 V thereby causing the sounding of an audible alarm.

The eject lamp 208 is connected through a connector JP2-3 to the collector of a transistor Q1. The base of transistor Q1 is connected to bit position 2 of the I/O bus 292 and through a resistor 250 to ground while the emitter of the transistor is connected directly to ground. When the signal PB2 is a logic 1 it causes transistor Q1 to conduct so that current flows from lead 252 through the eject lamp 208 and transistor Q1 to ground thereby lighting the lamp.

The full bale lamp 210 and the ready lamp 212 are connected through transistors Q2 and Q3, respectively, to bit positions 3 and 4 on the I/O bus. Therefore, when signal PB3 is a logic 1 the full bale lamp 210 is lit and when the signal PB4 is a logic 1 the ready lamp 212 is lit.

Bit position 5 of the I/O bus 292 is connected to one input of a NAND 256. The other input of NAND 256 is connected to +5 V while the output is connected to the base of a transistor Q4 and through a resistor 258 to ground. The emitter of Q4 is grounded while the collector is connected through a diode 262 to +12 V. The collector of Q4 is also connected through the extend relay K1 to the junction 260 which, as previously described, is normally at +12 V. Therefore, when the signal PB5 is logic 0 the logic 1 output of NAND 256 turns transistor Q4 on and current flows from junction 260 through the extend relay K1 and transistor Q4 to ground.

When relay K1 is energized it controls bidirectional linear motor 216 to extend the twine tubes of the baler i.e. drive them away from the home position. Motor 216 is connected through connectors P2-1 and D-5 to normally open relay contacts K2a and normally closed contacts K2b as well as one side of a varistor 264. The other side of motor 216 is connected through connectors P2-2 and D-6 to normally open relay contacts K1a and normally closed contacts K1b as well as the other side of varistor 264. The relay contacts K1a and K2a are connected through a 20 amp circuit breaker 266 to the power on switch 222. When the relay K1 is energized a circuit is established from battery 218, the on/off switch 222, circuit breaker 266, contacts K1a (now closed), the motor 216, and contacts K2b to ground. The resulting current flow drives the motor 216 in a direction to extend the twine tubes.

Relay K2 is energized in order to retract the twine tubes, i.e., move them from the extended position back to the home position. Relay K2 is connected to the collector of a transistor Q5. The emitter of Q5 is grounded and the collector is connected through a diode 268 to +12 V. The base of transistor Q5 is connected to the output of a NAND 270 and through a resistor 272 to ground. One input of NAND 270 is connected to +5 V and the other input is connected to bit position 6 of the I/O bus 292. When the signal PB6 is logic 0 the output of NAND 270 causes transistor Q5 to conduct so that there is current flow from junction 260 through relay K2 and transistor Q5 to ground thereby energizing relay K2.

When relay K2 is energized a circuit is formed from battery 218 through on/off switch 222, circuit breaker 266, relay contacts K2a (now closed), motor 216, and relay contacts K1b to ground. Since current flow through motor 216 is in the opposite direction from the current flow when relay K1 is energized, the motor is driven in the reverse direction thereby causing the twine tubes to move from the extended position back toward the home position.

FIG. 3 illustrates the signal processing means which responds to actuation of the switches shown in FIG. 1 to produce output signals for controlling the alarm, lamps and relays K1 and K2 shown in FIG. 2. The signal processing means includes a microporcessor 300, a read only memory (ROM) 302, a non-volatile random access memory (RAM) 304, a versatile interface adapter (VIA) 306 an address decoder 308 and a watch circuit 360. All units except the watch circuit are interconnected by an 8-bit data bus 310 and a 16-bit address bus 312.

The microprocessor 300 may be a type 6802 microprocessor such as the model HD6802W available from Hitachi and described in the Hitachi Microprocessor Data Book No. HLN-602 and includes an internal memory for storing data during a processing operation. The microprocessor has eight data input/output D7-D0 which are connected to the data bus 310 and sixteen output terminals A15-A0 for supplying an address generated within the microprocessor to the address bus 312. When a data register within the microprocessor is loaded with a byte of data for application to the data bus the microprocessor drives the signal R/$\overline{W}$ on lead 330 to logic 0 and when the data register is to receive a byte of data from the data bus the microprocessor causes the signal R/$\overline{W}$ on lead 330 to go to logic 1. When the microprocessor places an address on the address bus it generates the signal Valid Memory Address (VMA) on lead 14 and this signal is applied to the gating input of address decoder 308. The microprocessor outputs a single phase clock onto lead 328 from its E terminal.

Microprocessor 300 has a non-maskable interrupt (NMI) input terminal. A low going signal at this terminal causes the microprocessor to initiate a non-maskable interrupt sequence. The microprocessor also has a reset input terminal $\overline{RES}$ and when the signal on lead 314 goes to logic 0 the registers within the microprocessor are cleared and the microprocessor becomes inactive. When the signal $\overline{RES}$ goes to logic 1 it causes the microprocessor to begin a restart sequence.

Address bus bits A15-A13 are connected to input terminals A-C of address decoder 308. Each time the microprocessor outputs a signal on lead 314, it enables address decoder 308 to decode the three address bits and produce a signal on one of the leads 316, 318, or 320. The lead 316 is connected to the $\overline{CS2}$ input of VIA 306. The lead 318 is connected to the $\overline{OE}$ and $\overline{CE}$ inputs of ROM 302 and a lead 320 is connected to one input of a NOR 322.

The ROM 302 may be a type 2716 capable of storing 2048 8-bit bytes. When the signal on lead 318 is a logic 0 the ROM places on the data bus the 8-bit byte stored at the address specified by the address applied to the ROM from the address bus 312. ROM 302 stores the program which is normally executed by the system as well as a factory test program (PTST) which can be executed only if terminal PB2 of VIA 306 is manually connected to ground.

The RAM 304 may be a type XD2212 E²PROM such as that manufactured by Xicor Corporation. It is a non-volatile memory capable of storing 256 nibbles or half-bytes and is used to store a sequence table which controls execution of a wrap sequence as subsequently described. RAM 304 is enabled to read or write only when its chip select ($\overline{CS}$) input terminal is at logic 0. When microprocessor outputs the signal E on lead 328 it is inverted by NOR 324 and blocks one input of NOR 322. If the address placed on the address bus by the microprocessor 300 is an address in the RAM 304, the address is decoded in decoder 308 which then produces a logic 0 output signal on lead 320 to block the second input of NOR 322. NOR 322 produces an output signal that is inverted by NOR 326 and applied to the $\overline{CS}$ input of RAM 304 to enable the RAM to read or write. If the instructions being executed by the microprocessor is a read instruction then the microprocessor drives lead 330 high and if it is a write instruction the microprocessor drives the lead 330 low. Lead 330 is connected to the write enable ($\overline{WE}$) input of RAM 304. When RAM 304 receives a logic 0 signal at input terminal $\overline{WE}$ it is enabled to write into the address applied to it from the address bus the four low order bits applied to it from the data bus 310. On the other hand, if the signal on lead 330 is at logic 1 then the RAM will output onto the four low order bits of the data bus 310 the value stored at the address applied to the RAM from the address bus.

RAM 304 includes a static RAM level and an E²PROM level. A store ($\overline{STR}$) input terminal of the RAM 304 is tied through a resistor 348 to +5 V. The terminal is also connected by a lead 352 to the CA2 output of VIA 306. A low-going signal on lead 352 strobes RAM 304 to copy data stored in the static RAM section of the memory into the E²PROM section.

RAM 304 has an array recall ($\overline{AR}$) terminal which is connected by a lead 350 and a resistor 346 to +5 V. The lead 350 is also connected through a resistor 340 to signal ground so that normally the lead 350 is at the high level. When power is applied to the system a low level signal is applied to terminal $\overline{AR}$ to recall data from the E²PROM section and store it in the static RAM section. Lead 350 is connected to the collector of transistor Q8 whose base is connected through a resistor 342 to a lead 362. The emitter of Q8 is grounded. When the system is reset the signal RES on lead 362 goes to logic 1 and transistor Q8 conducts thereby applying a logic 0 over lead 350 to the $\overline{AR}$ terminal of RAM 304. This transfers data stored in the E²PROM section to the static RAM section.

The Versatile Interface Adapter (VIA) 306 may be a type 6522 such as that manufactured by Rockwell or Synertek. It has two 8-bit input/output ports PA and PB. The bit positions of the two ports are individually programmable as either an input or an output. In the present invention the VIA is programmed so that all bit positions of port PA serve as inputs. All positions of port B are programmed as outputs except bit position 1 which is programmed as an input.

As disclosed at pages 2526–2530 of the publication *IC Master* 1980, published by United Technical Publications, the VIA 306 includes 16 addressable registers and counters. These registers and counters are addressed by applying an address from the four low order bits of the address bus 312 to the register select inputs RS3-RS0. Data is read from, or entered into the registers and counters through data terminals D7-D0 which are connected to the data bus 310. The VIA is enabled only when the microprocessor outputs a hexadecimal address 4XXX. The high order bits of the address are decoded by address decoder 308 to produce a logic 0 signal on lead 316 which enables the Chip Select ($\overline{CS2}$) input of the VIA. The register or counter which is accessed is determined by the four low order bits on the address bus which are applied to register select inputs RS3-RS0 of the VIA. The accessed register or counter is either read from or written into depending upon whether the microprocessor 300 outputs a logic 1 or logic 0 signal, respectively, on lead 330. The $\emptyset 2$ input of the VIA is a clocking input and is used to trigger data transfers.

All circuits within VIA 306 are reset when the signal $\overline{RES}$ on lead 440 is logic 0. The VIA 306 produces two output signals CA2 and CB2 which are used for hand-shaking and control purposes respectively. The program described below periodically sends a byte of control information to VIA 306 to toggle CB2 and pulse watch circuit 360. The CA2 output is toggled in order to strobe data from the static RAM section into the E²PROM section of the non-volatile RAM 304.

Since the details of the VIA 306, microprocessor 300, ROM 302, RAM 304 and address decoder 308 are well known in the art, they are not described in detail herein. Generally speaking, the microprocessor 300 senses input signals on bus 142 and, in response to these signals, controls the twine tube mechanism and provides indications to the operator by placing signals on bus 292. The sensing of input signals on bus 142 and the application of output signals to bus 292 are subsequently described in connection with flow diagrams.

The watch circuit 360 is a monitoring circuit which is utilized to reset the system if the microprocessor program should "hang up" or if the filtered voltage +12 $V_1$ should drop below an operable value. Written into the microprocessor program is a routine which is periodically called and, when called, causes VIA 306 to produce a signal on lead 366 to reset the watch circuit 360. As long as the watch circuit is periodically reset its output signals RES and $\overline{RES}$ remain logic 0 and logic 1, respectively. If the watch circuit is not periodically reset, or if the +12 $V_1$ voltage should drop below an operable level of about 8 V, the signals RES and $\overline{RES}$ go to logic 1 and logic 0, respectively, to reset microprocessor 300, RAM 304 and VIA 306.

NORMAL START-UP AND AUTOMATIC OPERATION

Normal start-up is defined by existence of the following conditions at the time the switch 222 is turned on to supply power to the control circuit:
  a. twine tubes in home position
  b. no full bale in the baler
  c. tailgate closed
  d. retract/extend switch 106 off
  e. switch 108 set to "auto"
  f. tie switch 110 not actuated A normal start up begins with the Initialize Routine illustrated in FIGS. 6A and 6B. The purpose of this routine is to initialize the system, sample the input bus, and, from the sample taken determine to which routine a branch should be taken. The routine begins at step 600 by initializing the stack pointer in microprocessor 300 and initializing certain registers in VIA 306. Specifically, the Data Direction Register B (DDRB) within VIA 306 is loaded with the value 7D(H) which sets port B terminal PB1 as an input terminal and PB7 as a timer output with the remainder of the terminals being set as output terminals. Next, Output Register B (ORB) in VIA 306 is initialized with the value E3(H).

After register ORB is loaded, the value 00 is loaded into Data Direction Register A (DDRA) in VIA 306 thereby setting all bit positions of port A for receiving input signals. After DDRA is loaded the Auxiliary Control Register (ACR), the Peripheral Control Register (PCR) and the Interrupt Enable Register (IER) in the VIA 306 are initialized.

At step 602 the microprocessor clears a bank of 9 switch registers which are merely addressable locations in the static RAM contained within microprocessor 300 each of which stores an indication of the state of an associated switch the last time the input ports of the VIA 306 were sampled. There are nine switch registers, one for each of the eight sets of switch contacts shown in FIG. 1 and one for a factory programmed test input which is obtained by grounding input PB1 of VIA 306. At step 604 the value 01 is loaded into a further register in the static RAM to store a "Not Home" flag and two further registers which store a "Ready Lamp Flashing" flag and a "Test" flag are cleared.

At step 606 the value FD(H) is loaded into the DDRB register within VIA 306. This sets terminal PB7 as an output terminal with terminals PB0–PB6 remaining the same as when set in step 600. The ACR register within VIA 306 is loaded with the value C0(H) which controls Timer 1 in the VIA for free running and controls port PB7 for producing a square wave output at the output frequency of Timer 1. Microprocessor 300 then executes a Software Interrupt (SWI) to call the Non-Maskable Interrupt (NMI) routine.

The NMI routine is entered at step 500 in FIG. 5A where the microprocessor 300 loads the timer 1 counter and latch in VIA 306 so that the timer outputs a 100 Hz. square wave on PB7 to interrupt the microprocessor 300 through its $\overline{NMI}$ input every 10 ms. Therefore, after step 500 is executed the microprocessor is interrupted every 10 ms to execute the NMI Routine.

At step 502 the microprocessor reads the Port B Input Register (IRB), masks off the PTST bit from bit position 1, and uses this bit to update the PTST switch register. PTST is a production test signal which is utilized during check-out of a new control system, or is utilized for diagnostic purposes when a control system is returned by a customer for service. The PTST signal is input to Port B by manually shorting PB1 to ground.

At step 506 the microprocessor reads the Input Register for Port A (IRA), isolates each of the individual input bits and uses these individual input bits to update the switch registers for the tie, learn, manual, external, retract, tailgate, full bale, and home position switches of FIG. 1. Five consecutive samples of a switch setting are required in order to change the setting of a switch register with one sample being taken at step 506 each time the NMI Routine is executed. Thus, the NMI Routine must be executed five times before the state of a given switch register may be changed. This eliminates the effect of "contact bounce".

At step 508 the Test flag is sampled and since it was reset at step 604 the microprocessor branches to step 510 to update an "oscillator" flag. The oscillator flag is a register which is incremented by five each time step 510 is executed. The flag is "on" when the count in the register is 00-7F and is "off" when the count is 80-FF. The flag is used to alternately turn the audible alarm 214 and ready and full bale lamps on and off as subsequently described.

At step 512 the Home Position switch register is checked to see if the twine tubes were in the home position when step 506 was executed. Assuming the twine tubes were in the home position then at step 514 a retract disable counter is checked to see if it has been decremented to zero. Assuming that the count is zero then at step 516 the value BD(H) is transmitted to the Data Direction Register in VIA 306 so that the "retract" or PB6 output is disabled. The program then updates the Home Position T.D. switch register to reflect that the twine tubes are in the home position. The purpose of the Home Position T.D. switch register and the retract disable counter is to determine that the Home Position switch is fully actuated, thereby eliminating an intermittent "on-off-on" sequence as the switch is magnetically or mechanically actuated.

At step 518 (FIG. 5B) the Ready Lamp Flashing flag is tested. Since this flag was cleared at step 604, a branch is made to step 520 where the Full Bale Alarm On flag is tested. Since this flag has not been set, the program branches to FIG. 5C where, at step 526, the Full Bale switch register is tested. Under the assumed conditions this register was cleared at step 506 so the program proceeds to steps 528 and 530 where the Full Bale flag is cleared and the Full Bale T.D. switch register is set. When this register is set it provides an indication that a 3-second timing interval is in progress if the Full Bale flag has also been set as subsequently described. After the Full Bale T.D. switch register is set, the program returns to the Initialize Routine.

Upon return to the Initialize Routine there is a delay at step 610 of 60 ms during which time the microprocessor executes six times a loop including a Wait For Interrupt instruction. This allows multiple samplings of the inputs to ports A and B during multiple executions of the NMI Routine for switch "debouncing" purposes.

At step 612 a jump is made to a Retrieve Routine which retrieves a Learn Sequence Table from RAM 304 and loads it into the memory in the microprocessor 300. The Learn Sequence Table defines the movements and dwell times of the twine tubes during the wrapping operation. The Learn Sequence Table is generated and loaded into the RAM 304 as subsequently described by setting switch 108 to the program position and selectively operating switch 106 to the retract and extend positions. Since the RAM 304 is non-volatile, a Learn Sequence Table entered therein remains in the RAM even though power may be turned off. The Retrieve Routine is shown in detail in the appended program listing.

Upon return from the Retrieve Routine the Initialize Routine jumps to a Production Test (PTST) Routine at step 614. The first operation performed in this routine is a test of the PTST switch register. Since it is assumed that the PTST input signal to PB1 is a logic 0, a return jump is immediately made back to the Initialize Routine. The PTST Routine is also given in the appendix.

Figures 8A, 8B:
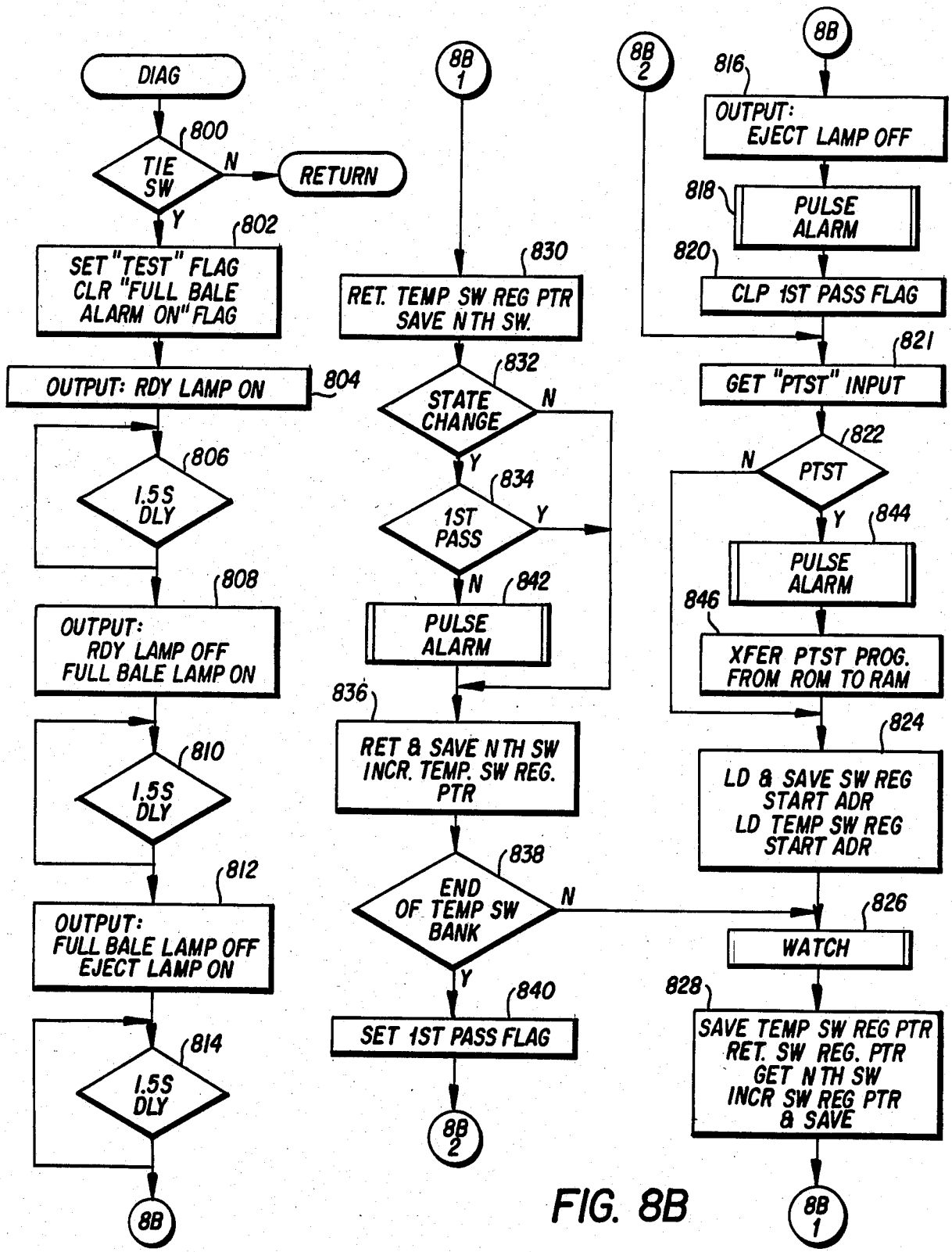
FIGS. 8A-8B comprise a flow diagram illustrating the Diagnostic Routine.

In FIG. 6A, the Initialize Routine next jumps to a Diagnostic Routine 616. The Diagnostic Routine is illustrated in FIGS. 8A–8B and is executed only if the operator is holding the tie switch 110 closed at the time he closes the power on switch 222. At step 800 the Tie Switch register is tested to see if the tie switch was on at the time port A was read during step 506 of the NMI Routine. Since it was assumed that the tie switch was off, a return is immediately made to the Initialize Routine.

In FIG. 6B, at step 618, the Full Bale switch register is checked to see if a full bale condition existed at the time port A was sampled at step 506. Assuming a full bale condition did not exist, then at step 622 the Tie flag is cleared. The Tie flag is merely an indicator as to whether or not a tie operation should be performed.

At step 624 the microprocessor reads an All Lamps On code from ROM 302 and transmits it to Output Register B in VIA 306. Port B outputs signals over bus 292 to turn on transistors Q1-Q3 and illuminate the eject lamp 208, the full bale lamp 210 and the ready lamp 212. After the lamps are turned on then the microprocessor executes a loop of instructions at step 626 for one second and during each execution of the loop the watch circuit 360 is pulsed. This insures that the lamps remain on for one second which is a sufficient interval for the operator to observe the lamps and insure that they are all operating.

After the lamps have been on for one second then at step 628 the microprocessor reads from memory a code for turning off all of the lamps and this code is transmitted to the Output Register B in VIA 306 to turn off the lamps. This concludes the Initialize Routine and the microprocessor proceeds to the Main Routine illustrated in FIGS. 7A-7E.

At step 700 the Main Routine jumps to the Watch Routine to cause output CB2 of VIA 306 to pulse the watch circuit 360. At step 702 the contents of the Home switch register are checked to see if the twine tubes were in the home position at the time the inputs to port A were last sampled at step 506. Under the assumed conditions the twine tubes are in the home position so the program proceeds to step 704 where the tailgate switch register is checked to see if the tailgate was closed at the time step 506 was last performed. Again, under the assumed conditions the tailgate was closed so the program branches to step 706 where the Tie flag is tested to see if it is on. Under the assumed conditions the Tie flag was cleared at step 622 so a branch is taken to step 708 where the Full Bale Alarm On flag is cleared and the microprocessor sends to VIA 306 a code for setting the alarm 214 in the off condition, the full bale lamp 210 in the off condition and the ready lamp 212 in the on condition.

At step 710 the Not Home flag is tested to see if it is set. This flag was set at step 604 so the program proceeds to step 712 where a subroutine is executed to pulse the audible alarm 214 for approximately one-half second. The subroutine for pulsing the alarm is given at steps Main 15-Main 30 of the appendix. During the subroutine the microprocessor executes a loop of instructions by outputting through VIA 306 port B signals which drive PB0 alternately high and low to pulse the alarm. During each execution of the loop a Wait For Interrupt instruction is executed followed by a jump to a subroutine which pulses the watch circuit 360.

After the alarm has been pulsed for approximately one-half second the program proceeds to step 714 where the Not Home flag is cleared. At step 716 (FIG. 7B) the Full Bale T.D. switch register is tested. This register was set at step 530 so the program proceeds to step 718 where the Tie switch register is checked. Since the tie switch was not operated when step 506 was last performed the test proves false. The program proceeds to FIG. 7D where, at step 720, a jump is made to the Watch Routine to pulse the watch circuit 360. Upon return from the Watch Routine the Learn switch register is checked at step 722 to see if the switch 108 was in the "learn" position at the time step 506 was performed. Since it is assumed that it was not, the program proceeds to step 724 where the Full Bale Alarm On flag is set.

At step 726 the Manual switch register is checked to see if the switch 108 was set to the "manual" position at the time step 506 was performed. Assuming that it was not, the program branches to step 728 where a check is made to see if the Ready Lamp Flashing flag is set. Under the assumed conditions it was cleared at step 604 so the program returns to the first step of the Main Routine in FIG. 7A. In summary, assuming that the twine tubes are in the home position, the tailgate is closed, the switch 106 is in the off position, the switch 108 is in the auto position, there is no full bale in the baler and the tie switch is not depressed at the time the power switch 222 is turned on, the control circuit turns on the lamps 208, 210 and 212 for an interval of one second, turns the lamps off, turns the ready lamp 212 back on and pulses the alarm 214 for a short interval. Thus, the microprocessor has self-tested the audible and visual alarms and determined that the tailgate is closed and the twine tubes are in the home position.

Figure 7A:
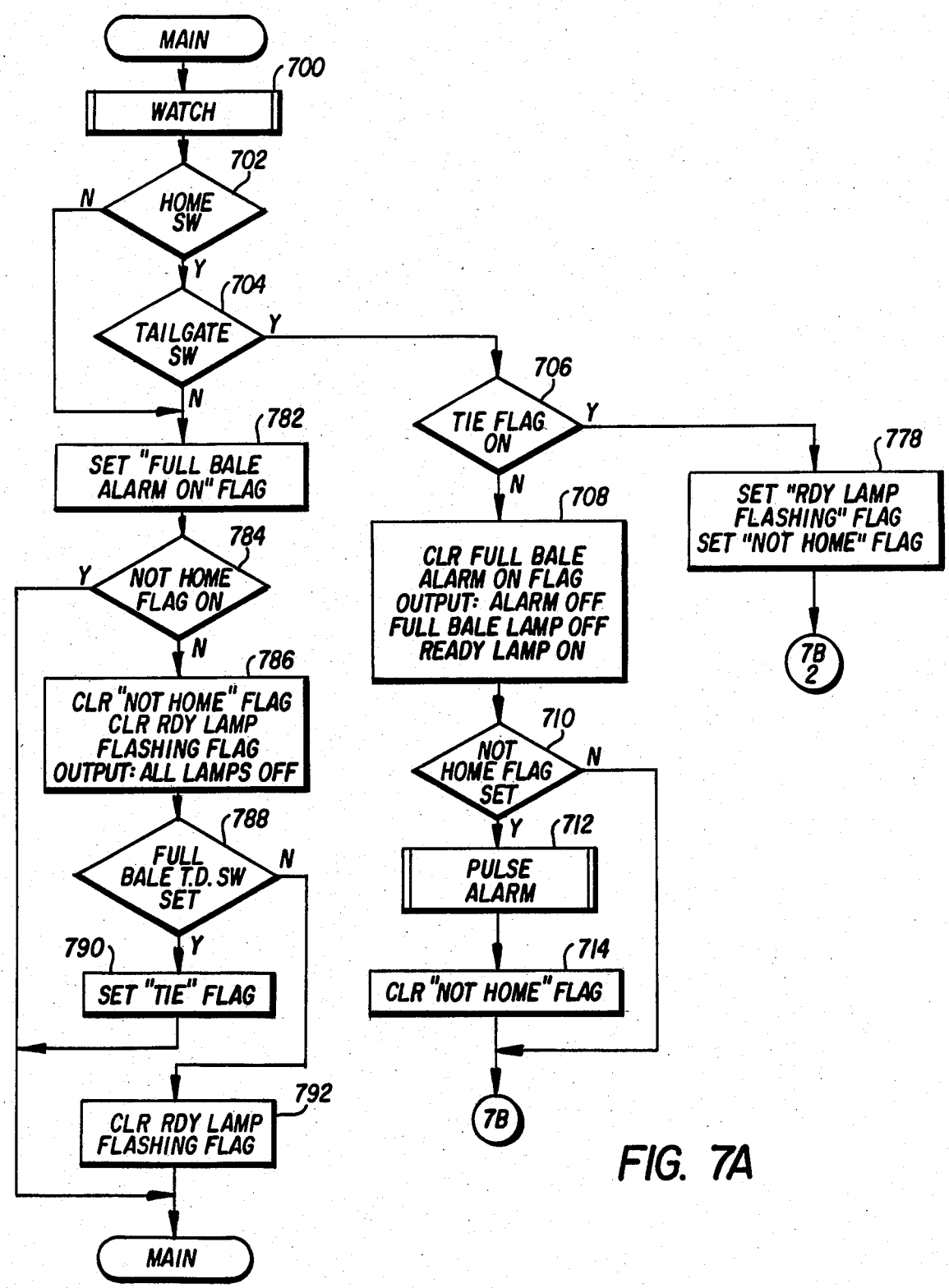

When the program jumps back to the start of the Main Routine it proceeds through the steps previously described until it reaches step 710 (FIG. 7A). At this point it will find that the Not Home flag is not set, the flag having been reset at step 714 of the first run through the Main Routine. Therefore, the program will branch from step 710 to step 716 and will not pulse the audible alarm 214. From step 716 the program is executed as previously described and the Initialize Routine will be repeatedly executed until there is some change in the input signals to port A. During this interval the ready lamp 212 remains on and the Main Routine is interrupted every 10 ms to execute the NMI Routine.

When the ready lamp is on it signals the operator that he may begin forward motion of the tractor along a windrow to begin forming a bale. While the bale is being formed the microprocessor 300 continuously executes the Main Routine previously described, bypassing step 712 which pulses the alarm. Since timer 1 of VIA 306 begins outputting a 100 Hz square wave through Port PB7 at step 606 of the Initialize Routine, the microprocessor 300 is interrupted every 10 ms and executes the NMI Routine to sample ports A and B and update the switch registers. When the baler has been pulled along a windrow a sufficient distance to form a full bale, the upper apron of the baler actuates the full bale switch 102.

On the fifth NMI after the full bale switch 102 is actuated, at step 506 this condition is sensed when port A is read. The program proceeds through the NMI Routine as previously described until it reaches step 526 (FIG. 5C) where the test shows that the Full Bale switch register is set. The program branches to step 532 to see if the Full Bale flag is set. Up to this time the Full Bale flag has not been set since it is an indicator that an actuation of the full bale switch is being responded to. Since the full bale switch is closed and the Full Bale flag is not set, the program sets the Full Bale flag at step 534 and sets a one second timer at step 536. At step 538 the timer is tested to see if the time delay is complete and since it is not the timer is decremented and saved at step 540 before a return is made to the Main Routine at the point of interruption.

Figure 7D:
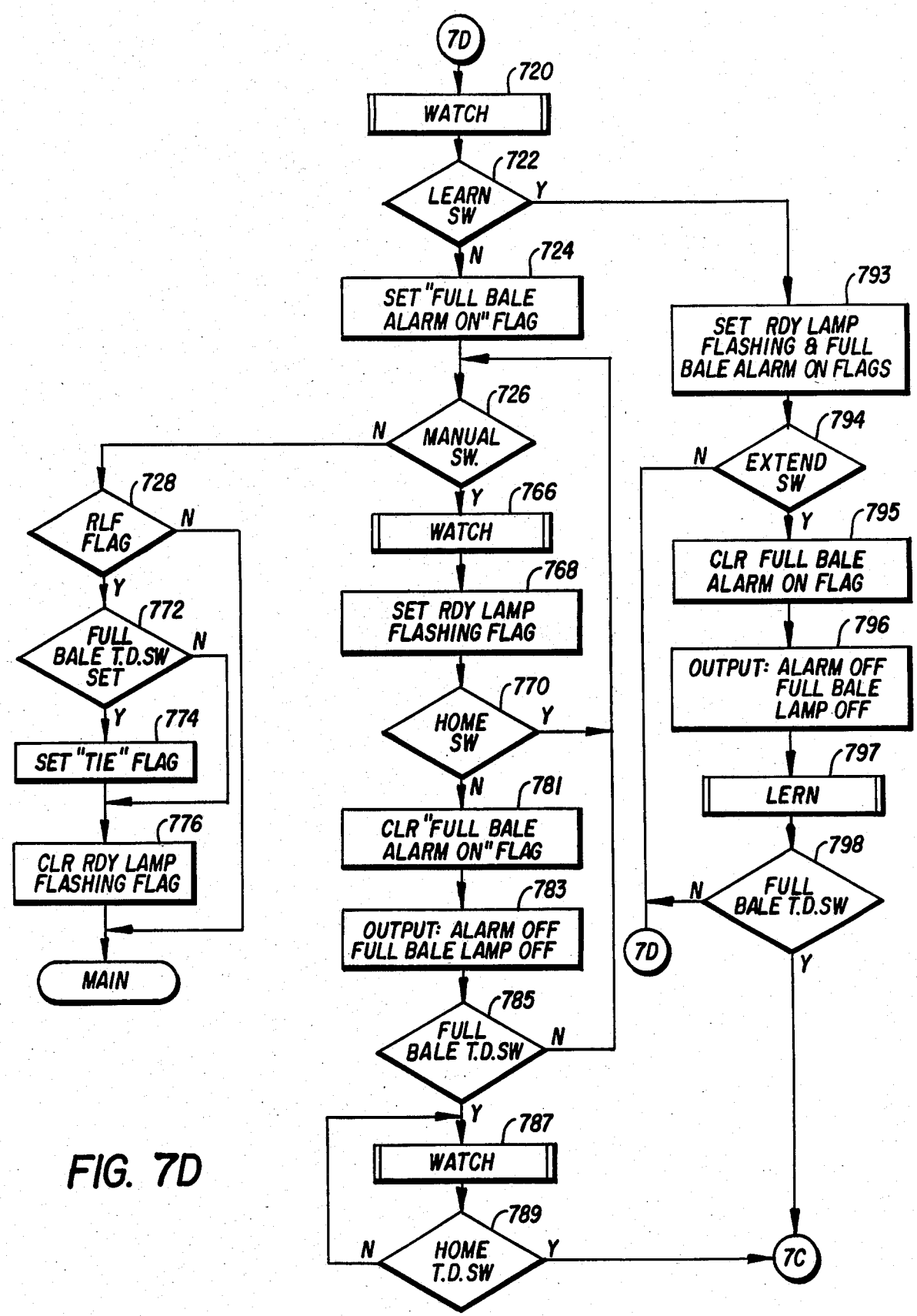

The Main Routine is continuously executed by following the steps 700-710 (FIG. 7A), 716 and 718 (FIG. 7B), and 720-728 (FIG. 7D). Every 10 ms the main program is interrupted to execute the NMI Routine which includes steps 500-520, 542, 546, either step 548 or 550, and steps 526, 532, 538 and 540.

Each time the NMI Routine is executed the one-second timer is decremented at step 540 provided the full bale switch is actuated. On the first pass through the NMI Routine after the timer has been decremented to zero, the test at step 538 (FIG. 5C) proves true and the program proceeds to step 552 where it clears the Full Bale T.D. switch register before returning to the Main Routine. The purpose of the Full Bale T.D. switch register and the one-second timer is to eliminate false triggering which might otherwise result from operation of the full bale switch 102 by an elliptically formed bale.

With this register cleared, the test at step 716 (FIG. 7C) proves true and the program proceeds to step 730 where the full bale lamp and alarm 214 are turned on. This is a signal to the operator that he should stop forward motion of the tractor so that the fully formed bale may be wrapped, i.e. tied with twine. This operation is automatically initiated by the program when a return is made to the Main Routine after clearing the Full Bale T.D. Switch register at step 552. At step 732 a count is loaded into a timer register and at step 734 a loop of instructions including a Wait For Interrupt instruction is executed with the count in the register being decremented on each pass through the loop. After approximately three seconds the loop times out and the program proceeds to step 736 where the Tie flag, Ready Lamp Flashing flag and Full Bale Alarm On flag are all cleared and output signals are sent over bus 292 to turn the full bale lamp on and turn the alarm and ready lamp off.

At step 738 the microprocessor loads the pointer to the starting address of a Wrap Routine and at step 740 a jump is made to the Wrap Routine (FIG. 9A) which controls the motion of the twine tubes as the bale is being wrapped. Upon completion of the Wrap Routine the program returns to FIG. 7C and at step 742 the full bale lamp is turned off and the alarm and eject lamp turned on.

At step 744 a timer count is set into a register after which a loop of instructions is executed at steps 746 and 748 to decrement the timer count, pulse the watch circuit 360 and wait for an interrupt. After about one-half second the timer count is decremented to zero and the program proceeds to step 750 where the alarm is turned off.

The sounding of the alarm together with the turning on of the eject lamp signals the operator that the wrapping operation is complete and he may eject the wrapped bale from the baler. This is accomplished independently of the circuits shown. The operator depresses a switch which actuates the mechanism on the baler which raises the tailgate and permits the bale to fall to the ground behind the baler.

After the alarm is turned off at step 750 the program successively executes a loop of instructions at steps 752, 754 and 756. At step 752 the Tailgate switch register is tested to see if the tailgate has been opened. Assuming it has not, the watch circuit 360 is pulsed at step 754 and at step 756 the Tie switch register is checked to see if the tie switch was operated. Under the assumed conditions it was not so the program loops back to step 752.

When the operator operates the switch which opens the tailgate then, on the fifth NMI after the tailgate switch is actuated, the Tailgate switch register is set at step 506 (FIG. 5A) when port A is read and the switch registers are updated. After this NMI is completed a return is made to the Main Routine and on the next pass through step 752 the program finds the Tailgate switch register set. The program then proceeds to step 758 where signals are fed to bus 292 to turn off the ready, full bale and eject lamps.

After the lamps are turned off the program enters a loop including steps 760 and 762. Step 760 pulses the watch circuit 360 while step 762 tests the Tailgate switch register to see if the tailgate is closed. Since it takes some time for the tailgate to open fully, release the bale, and then close, many loops are made through steps 760 and 762. Every 10 ms the NMI Routine is entered to read the inputs to port A of VIA 306. The fifth pass through NMI after the tailgate is closed senses this fact at step 506 and updates the Tailgate switch register. When the NMI Routine returns to the Main Routine then, when the step 762 is next executed, it finds that the tailgate is closed and proceeds to step 764 where it sets the Not Home flag.

At this time a complete baling operation has been performed. The program jumps from step 764 to step 720 (FIG. 7D) and executes steps 722, 724, 726 and 728, before returning to the beginning of the Main Routine In FIG. 7A the program moves through steps 700-708 and at step 710 finds the Not Home flag set. Therefore, the ready lamp is turned on at step 708 and the alarm is pulsed at step 712 to call the operator's attention to the fact that he may again begin forward motion of the tractor.

OTHER SWITCH CONDITIONS AT START UP

If power is turned on and all of the switches are in the conditions given in the preceding section except that switch 108 is in the manual position, the system will cause the ready lamp to flash on and off. The Initialize Routine of FIGS. 6A and 6B is first executed and the program proceeeds to the Main Routine where it executes steps 700-714 (FIG. 6A), steps 716 and 718 (FIG. 7B) and steps 720-724 (FIG. 7D) all as described in the preceding section. However, when the test is made at step 726 it will prove true and the program pulses the watch circuit 360 at step 766 and sets the Ready Lamp Flashing flag at step 768. The Home Switch register is tested at step 770 and since the twine tubes are assumed to be in the home position the program branches back to step 726 and repeats the loop of operation 726, 766, 768 and 770.

Every 10 ms an NMI is executed, following steps 500-516 (FIG. 5A) as described in the preceding section. However, at step 518 (FIG. 5B) the test finds the Ready Lamp Flashing flag set and the program moves to step 554 to test the Oscillator flag.

The Oscillator flag is on for approximately 25 cycles through the NMI and off for the next 25 cycles. When the oscillator is on the program moves from step 554 to step 556 to turn the ready lamp on and if the oscillator is off then the program moves to step 558 to turn the ready lamp off. From step 556 or 558 the NMI Routine proceeds to step 520 where the test of the Full Bale Alarm flag proves false so the program moves to FIG. 5C. Assuming that there is no full bale in the baler at the time the power is turned on, the program proceeds from step 526 through steps 528 and 530 as previously described.

The loop of instructions 726, 766, 768 and 770 is repeatedly executed and is interrupted every 10 ms to perform the NMI Routine. Each time the NMI Routine is executed the Oscillator flag is updated at step 510 so that it will be on for 25 NMI cycles and off for 25 NMI cycles. This controls the selection of steps 556 and 558 for execution and causes the ready lamp to flash on and off.

If a full bale condition should exist when the operator changes switch 108 from the manual to auto position, a wrap sequence cannot be executed until after the operator depresses tie switch 110.

Considering first the case where a full bale condition exists and the switch 108 is switched from manual to auto, the program branches from step 726 to step 728 where the Ready Lamp Flashing flag is tested. The flag is set so the program proceeds to step 772 to see if the Full Bale T.D. switch register is set. If it is set then the Tie flag is set at step 774 before proceeding to step 776. On the other hand, if the Full Bale T.D. switch register is not set the program proceeds directly to step 776 where the Ready Lamp Flashing flag is cleared before returning to the start of the Main Routine in FIG. 7A. The program proceeds through steps 700, 702 and 704 to step 706. If the Tie flag is on the program moves to step 778, sets the Ready Lamp Flashing flag, clears the Not Home flag and moves to FIG. 7B where, at step 718 the Tie switch register is tested. Assuming that the operator does not immediately depress the tie switch the program moves to FIG. 7D and executes steps 720, 722, 724, 726, and 728 which is the beginning of the loop. The setting of the Full Bale Alarm On flag at step 724 enables the flashing of the full bale lamp when the NMI routine is executed. This loop is continuously executed until the next NMI. Assuming that the operator depresses the tie switch, this condition is sensed when the NMI is executed and port A is read at step 506. Upon return from the fifth NMI to the Main Routine, when step 718 of the Main Routine is reached the test of the Tie switch register proves true and the program branches to step 736 where the Tie flag, Ready Lamp Flashing flag and Full Bale Alarm On flag are all cleared before the sequence table pointer is loaded and the wrap sequence initiated. After the bale wrapping sequence is executed the program moves to FIG. 7C and executes steps 742-754 as previously described.

If the home position switch or the tailgate switch should fail in the open position the controller still provides a full bale warning, this warning being manifested by a flashing full bale lamp and a pulsating alarm. The operator can then perform a manual wrap using the extend/retract switch 106. Referring to FIG. 7A, if the home position switch or the tailgate switch should fail in the open position then the program moves to from step 702 or 704 to step 782 to set the Full Bale Alarm On flag. At step 784 the Not Home is tested. Assuming the Not Home flag is off the program sets the flag at step 786, clears the Ready Lamp Flashing flag and outputs a code to turn all lamps off. At step 788 the Full Bale T.D. switch register is tested to see if it is set. If it is set, the program proceeds to step 790 where the Tie flag is set. The program then branches back to the start of the Main Routine and continues executing the loop, execution of the loop being periodically interrupted to execute an NMI. With the Full Bale Alarm On flag set and with a full bale, then in FIG. 5C the Oscillator flag is tested at step 546. For approximately 25 cycles through the NMI Routine the oscillator flag will be set so that the full bale lamp and alarm are turned on at step 548. The oscillator flag is updated at step 510 of each run through the NMI Routine so that after each 25 runs through the routine the Oscillator flag will change state and step 550 will be executed to turn the alarm and the full bale lamp off.

DIAGNOSTIC ROUTINE

The Diagnostic Routine may be brought into play when the operator holds the tie switch 110 depressed at the time power is turned on. The program begins by executing steps 600-614 of the Initialize Routine (FIG. 6A) and branching to the Diagnostic Routine illustrated in FIGS. 8A-8D. In FIG. 8A, the Tie switch register is tested and since it is set the program proceeds to step 802 where it sets the Test flag and clears the Full Bale Alarm flag. The setting of the Test flag has the effect of limiting each execution of the NMI Routine to setting timer 1 and reading ports A and B. At step 804 a code is placed on bus 292 to turn the ready lamp on.

A delay loop is executed for 1.5 seconds at step 806 and after the loop times out the ready lamp is turned off at step 808 and the full bale lamp turned on. At step 810 another delay loop is executed and when this loop times out, signals are sent out over bus 292 to turn on the eject lamp and turn off the full bale lamp. At step 814 another 1.5 second delay loop is executed and when this loop times out the program moves to FIG. 8B where, at step 816 the eject lamp is turned off. After this lamp is turned off the program executes step 818 which pulses the alarm 214 for a period of about ½ second. Thus, each of the lamps 208, 210 and 212 and the alarm 214 are turned on in turn and the operator may visually or audibly determine that they are in operating condition.

After the alarm is pulsed a First Pass flag is cleared at step 820 and at step 822 the PTST switch register is checked to see if PB1 was grounded when step 506 of the NMI Routine was executed. Assuming it was not, the program proceeds to step 824 where the microprocessor loads and saves the pointer to the starting address of the switch register bank and also loads the starting address for a bank of temporary switch registers.

After the watch circuit 360 is pulsed at step 826, the microprocessor executes instructions as indicated at step 828 to save the starting address of the bank of temporary switch registers, retrieve the switch register pointer, fetch the contents of the first (PTST) switch register, and increment and save the switch register pointer. At step 830 the temporary switch register pointer is retrieved and the contents of the switch register are pushed onto the stack in the microprocessor. At step 832 the contents of the switch register are compared with the contents of the temporary switch register to see if they have different states. Assuming for the moment that they do, the program proceeds from step 832 to step 834 where the First Pass flag is tested to see if it is set. The First Pass flag was cleared at step 820 so the program skips to step 836 where the contents of the temporary register are retrieved and saved and the temporary switch register pointer is incremented.

Step 838 tests to see if the switch register and temporary switch register just processed are the last registers in their banks and if they are not the program branches back to step 826.

Generally speaking, one run through steps 826-838 causes the contents of one switch register to be compared with the contents of a corresponding temporary switch register and, at step 836, causes the contents of the switch register to be loaded into the temporary switch register. Therefore, eight cycles through the loop are required in order to load the eight temporary switch registers with the contents of the eight switch registers, these contents being determined by the state of the switches shown in FIG. 1 at the time step 506 of the NMI Routine is executed to sample the port A inputs.

After all of the temporary switch registers have been loaded then the test at step 838 will prove true and the First Pass flag is set at step 840 before the program branches back to step 821 to again update the first temporary switch register.

As long as the operator does not change the state of any of the switches shown in FIG. 1, or ground the PB1 terminal of VIA 306, there is no output signal sent to the audible alarm 214. However, the operator may test the various switches shown in FIG. 1 by manually actuating any of the switches and listening for the audible alarm to sound. If the operator actuates any of the switches it is sensed at step 506 of the next NMI Routine and the indications stored in the corresponding switch register. At step 832 when the contents of the switch register are compared with the contents of the temporary switch register a state change will be indicated. Since the First Pass flag is now set the program moves from step 832 through step 834 to step 842 where it pulses the audible alarm 214 for a short interval. After the alarm is pulsed the program moves to step 836 and proceeds back through the test loop as previously described. Thus, the operator may successively test each of the switches of FIG. 1 with the alarm being sounded after each switch is actuated.

If the test at step 822 shows that there is a PTST input, i.e. PB1 of VIA 306 grounded, the program executes a routine at step 844 to pulse the audible alarm and at step 846 loads the factory programmed test sequence into the RAM 304 by transferring it from ROM 302 to the memory in microprocessor 300 and then to RAM 304. From step 846 the program proceeds to step 824 and continues as described above.

The Diagnostic Routine may be terminated by the operator by turning off the power switch 222 and turning it back on without depressing the tie switch 110. It should be noted that with an operator's manual containing a set of instructions, an operator may test not only the switches of FIG. 1 and the visual indicators and audible alarm of FIG. 2, as described above, but may also test wiring and other elements of the system by following the instructions. Referring to FIG. 1, for example, assume that the Diagnostic Routine does not sound the audible alarm when the tailgate switch 104 is manually actuated. The problem could be either the switch or a broken wire in the switch circuit. Thus, if the operator shorts the input of amplifier 138 to ground, by disconnecting connector D and shorting pin D-2 to ground, and the alarm still does not sound then the problem is probably not with the switch. The operator might then reconnect connector D, disconnect connector P3, and ground the input to amplifier 138 by shorting pin P3-1 to ground. If the alarm now sounds the operator is instructed that the problem is in the wire 150 which he may then replace or repair. An exemplary set of operator instructions is set forth at the end of this specification.

LEARN ROUTINE

The Learn Routine is illustrated in FIGS. 11A-11D and is brought into play when the operator places switch 108 in the "learn" position so that the signal PA1 is applied over bus 142 to port A. The purpose of the Learn Routine is to enable the operator to selectively operate the retract and extend switches, the microprocessor responding to the operations of these switches to generate and store a sequence of control words which may later be retrieved from storage to automatically control energization of the twine tube drive motor during a bale wrapping sequence. On the fifth NMI after the switch is set to "learn" the NMI Routine reads port A at step 506 and sets the Learn switch register. Upon return to the Main Routine, and when step 722 (FIG. 7D) is reached, the program branches to step 793 where it sets the Ready Lamp Flashing and Full Bale Alarm On flags. At step 794 the Extend switch register is tested to see if the operator has moved switch 106 to the extend position. Assuming for the moment that he has not, the program branches back to step 720 and repeats the loop including steps 720, 722, 793 and 794. This loop is repeated until the operator moves switch 106 to the extend position.

The purpose of the Learn Routine is to enable an operator to store a sequence table which is a set of control words for controlling motor 216 to thereby control the motion of the twine tubes. By selectively moving switch 106 between the extend, off and retract positions the operator may generate the control words for the sequence table and when the sequence table has been fully generated it is stored in RAM 304.

Assuming that the operator moves switch 106 to the extend position then, on the fifth NMI, this condition is sensed at step 506 and the Extend switch register is set. On return to the Main Routine the Full Bale Alarm On flag is cleared at step 795 (FIG. 7D) and at step 796 an output is fed to bus 292 to turn off the audible alarm and the full bale lamp. A jump is then made to the learn sequence in FIG. 11A.

In the learn sequence the microprocessor first loads a value equal to the starting address of the sequence table minus 2 and retrieves a constant value representing an extend code and loads it into the accumulator in the microprocessor. Each control word in the sequence table being formed has two fields. Bits 13-0 comprise one field representing a time interval count. Bits 15 and 14 represent one of four codes as follows:

| Bits | Operation |
|------|-----------|
| 00   | Dwell     |
| 01   | Return    |
| 10   | Extend    |
| 11   | Home      |

At step 1102 the table pointer is incremented by two and then tested at step 1104 to see if the end of table has been reached. Assuming that it has not, the table pointer is saved and a time count register cleared at step 1106 and at step 1108 the accumulator is checked to see if it contains the Extend code. Since the twine tubes are normally in the home or retracted position, the first control word in the sequence table must always be for an extend operation and the Extend code was loaded into the accumulator at step 1100. Therefore, the test at step 1108 proves true and the program moves to steps 1110, 1112, and 1114 in sequence. At step 1110 a Wait For Interrupt is executed and at step 1112 the watch circuit 360 is pulsed. At step 1114 the time count is incremented and at step 1116 the Extend switch register is checked to see if the extend switch is still in the extend position. Assuming it is, the program loops back to step 1110 and repeats steps 1112, 1114 and 1116.

To digress for a moment, the operator normally sets the switch 108 to the learn position when he has a full bale in the baler ready for wrapping with twine. In FIG. 1 it will be noted that the extend and retract switches are connected at one side by leads 204 and 206 through relays K1 and K2 (FIG. 2) to +V. Therefore, as the operator moves the switch 106 between the extend and retract positions the relays K1 and K2 are operated to drive the motor 216 and therefore move the twine tubes. Thus, the operator may control the wrapping of a bale with twine in any manner he wishes and during this interval he is programming the wrap sequence which is stored in RAM 304 for subsequent use.

When the operator observes that the twine tube arms have been extended to a point where he wishes several circular wraps of the bale to be performed he moves the switch 106 to the off position. On the fifth following NMI, at step 506, port A is read and the switch registers updated to indicate that both the extend and retract switches are off. Upon return to the Learn Routine the test at step 1116 proves false and the program moves to step 1118 where the Retract switch register is tested and also found to be off. The program branches to step 1120 where a new (dwell) code is generated. The program moves to FIG. 11D where, at step 1122 the first control word is formed by concatenating the Extend code from step 1100 and the time count obtained the last time step 1114 was executed. The control word is stored in two consecutive locations in the memory within microprocessor 300. After the control word is stored, the microprocessor moves the new (dwell) code into the accumulator and returns to step 1102.

The table address pointer is incremented at step 1102 and checked at step 1104 to see if the top of the table has been reached. Assuming it has not, the pointer is saved and the time count register cleared. At step 1108 the new code entered into the microprocessor accumulator at step 1122 is tested to see if it is the extend code. Since it is not, the program branches to step 1124 and the accumulator tested to see if the code is the retract code. Since it is not the program moves to FIG. 11C where a loop of instructions comprising steps 1138-1148 is executed waiting for the operator to move the switch 106 to the retract or extend position. During each execution of the loop a Wait For Interrupt is executed at step 1138, the watch circuit is pulsed at step 1140, the time count register is incremented at step 1142, the Home Switch register is tested at step 1144 to see if the twine tubes are in the home position, the Extend Switch register is tested at step 1146 to see if switch 106 has been placed in the extend position and the Retract Switch register is tested at step 1148 to see if the switch 106 has been placed in the retract position.

When the operator moves the switch 106 to the retract position the Retract switch register is set on the fifth following NMI. On return to the Learn Routine the test at step 1148 will prove true and the program proceeds to step 1150 where the retract code is brought from memory to the accumulator. The program then proceeds to FIG. 11D to form the dwell control word using the time count obtained the last time step 1142 was incremented. The dwell control word is saved using the address pointer and the new control code (retract) is then loaded into the accumulator before the program returns to step 1102.

While the switch 106 is in the retract position the motor 216 is actuated to move the twine tubes arcuately in front of the bale which is being rotated within the baler. Meanwhile, the Learn Routine moves from step 1122 back to step 1102 and executes steps 1104, 1106 and 1108 as previously described before moving to FIG. 11B. At step 1124 the accumulator is tested and found to contain the retract code so the routine enters a loop of operations including steps 1126, 1128, 1130 and 1132. A Wait For Interrupt is executed at step 1126, the watch circuit 360 is pulsed at step 1128 and the time count register is incremented at step 1130. The Home switch register is tested at step 1132 and the Retract switch register is tested at step 1134. As long as the Retract switch register remains set the loop of operations including steps 1126-1134 is executed with the time count being incremented on each run through the loop.

When the operator moves the switch 106 to the off position this condition is sensed the fifth time an NMI is executed and the program moves to step 1136 where the Extend switch register is tested. Since it is off the program moves to step 1120 (FIG. 11A) where the dwell code is loaded into the accumulator before proceeding to FIG. 11D where the new control word (retract) is formed and stored in the table. The dwell code is loaded into the accumulator in the microprocessor and the routine returns to step 1102.

With the retract switch in the off position the motor 216 is not energized and the twine tubes are maintained in a fixed position so that circular wraps are formed around the rotating bale. When a sufficient number of circular wraps have been made around the bale the operator may move the switch 106 back to the retract position or to the extend position. Meanwhile, the program proceeds through steps 1102-1108, 1124, and 1138-1148 since the accumulator contains the dwell code so that the test at steps 1108 and 1124 prove false. From step 1148 the program loops back to step 1138 so that the time count is incremented each time a run is made through the loop.

If the operator should move the switch to the retract position the program moves to step 1150 and then proceeds as previously described to form another dwell control word. If the operator should operate the extend switch then the program will branch from step 1146 to step 1152 where the Extend code is loaded into the accumulator. The program then proceeds to step 1122 (FIG. 11D) where a dwell control word is formed using the time count last obtained at step 1142.

The operator may continuously operate switch 106 between the retract, off and extend positions to move the twine tubes back and forth in front of the rotating bale if he so desires to put overlapping wraps of twine on the bale. He may continue this operation until the sequence table is full or the home switch is actuated while switch 106 is in the retract position.

Figure 11E:
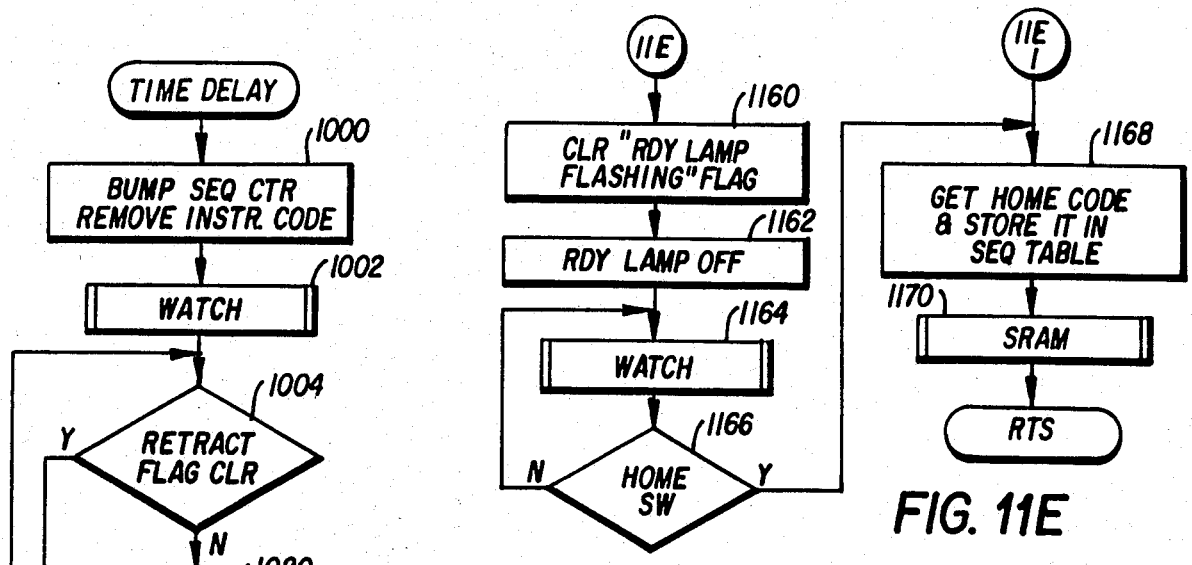

If the sequence table is full this is sensed at step 1104 and the program branches to FIG. 11E. At step 1160 the Ready Lamp Flashing flag is cleared and at step 1162 the ready lamp is turned off. At step 1164 the watch circuit 360 is pulsed and at step 1166 the Home switch register is tested to see if the twine tubes are in the home position. If they are not, the program loops back to step 1164 and repeats steps 1164 and 1166 until the operator moves switch 106 to the retract position to bring the twine tubes back to the home position. At step 1168 a constant representing the home code is stored in the sequence table as the last control word of the sequence. At step 1170 the SRAM Routine is executed to transfer the generated sequence table from the memory in the microprocessor 300 to the RAM 304. Upon return to the Learn Routine from the SRAM Routine a return is made to the Main Routine at step 798 to see if the Full Bale T.D. switch register is set. If there is no full bale the program loops back to step 720 of FIG. 7D but if there is a full bale the program moves to FIG. 7C where it proceeds as previously described. Generally speaking, the alarm is sounded and the eject lamp turned on before the Tailgate switch register is checked at step 752 to see if the tailgate is open. If it is not, the program loops through steps 752, 754 and 756 until the operator depresses the tie switch.

If the home switch should be actuated while the retract switch is actuated during the Learn Routine a branch is taken from either step 1132 or 1144 to step 1168 in FIG. 11E and proceeds in the same manner as for the "top of table" condition. The only difference is that steps 1160–1166 are bypassed so that the ready lamp is not turned off.

WRAP ROUTINE

The learn sequence table generated as described with reference to FIGS. 11A–11E is retrieved from RAM 304 at step 612 of the Initialize Routine when power is turned on so that it is available in the memory within the microprocessor 300. The Wrap Routine illustrated in FIGS. 9A–9D is called at step 740 (FIG. 7B) of the Main Routine in order to execute the sequence of control words stored in the sequence table. As the Wrap Routine is executed it automatically controls the movements of the twine tubes so that they move in exactly the same manner as when the Learn Routine was executed. The Wrap Routine begins at step 900 by clearing a Retract flag and getting the first control word of the sequence table. Assuming that the sequence table was formed as described in the preceding section, the first code word contains an extend code. This code is tested at steps 902 and 904 and the test at step 904 proves true. A branch is made to FIG. 9C where the least significant bits of the time count are saved at step 922. The microprocessor then outputs a code through VIA 306 to enable energization of the twine tube drive motor 216 and extend the twine tubes. At step 926 the most significant bits of the time count for the control word are retrieved and at step 928 a subroutine branch is made to step 928 where the time delay routine of FIG. 10 is executed to count out the time of the extend code word.

Figure 10:
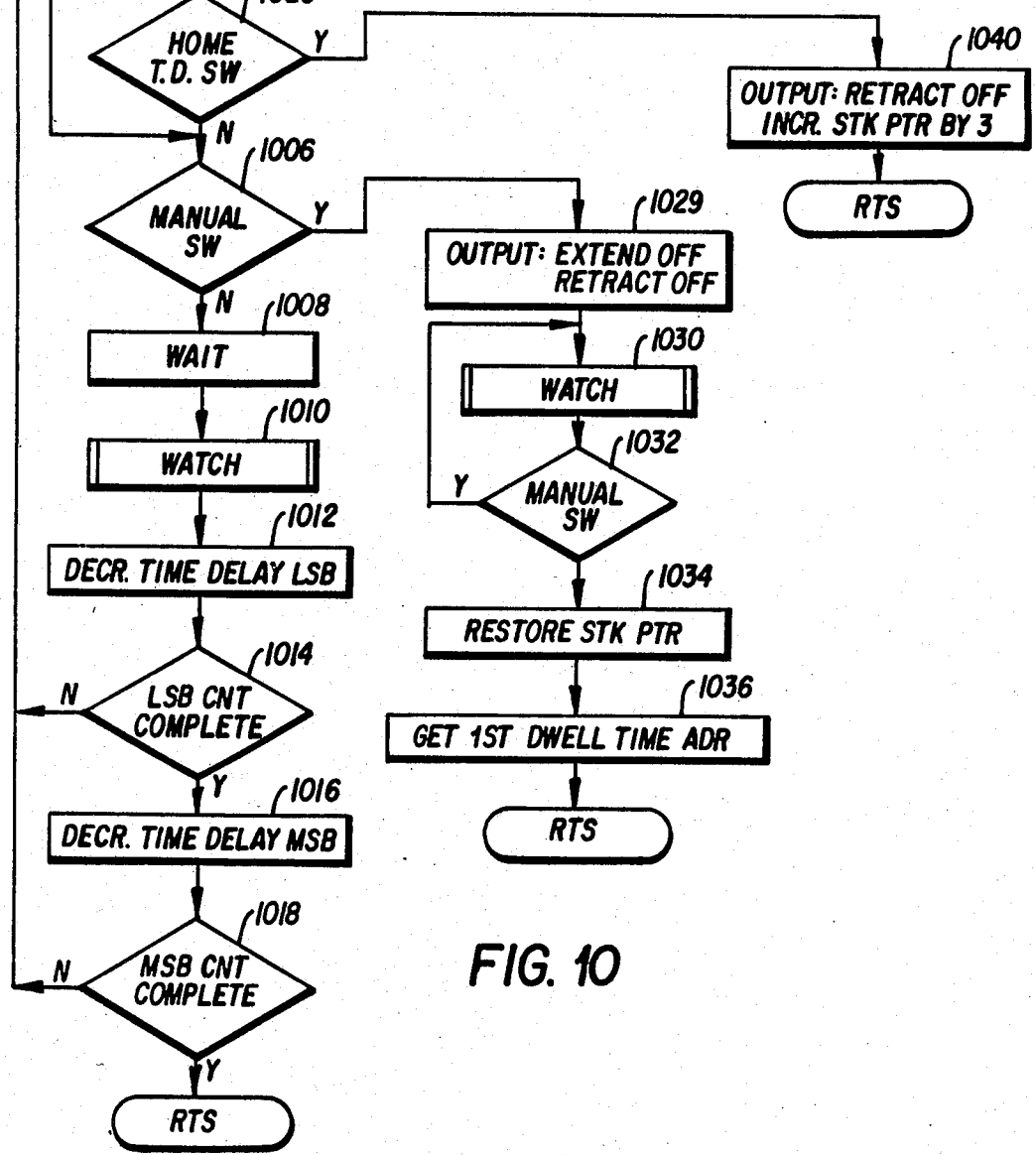
FIG. 10, is a flow diagram illustrating a Time Delay subroutine.

The Time Delay subroutine is illustrated in FIG. 10. At step 1000 the sequence table pointer is incremented by two so that it points to the address of the second control word in the sequence table. The control word code is masked off to obtain the incremental count before step 1002 is executed to pulse the watch circuit 360.

The Retract flag is tested at step 1004 and since this flag was cleared at step 900 a branch is made to step 1006 where the Manual switch register is tested. Assuming that switch 1008 is not in the manual position the program executes a Wait For Interrupt at step 1008 and pulses the watch circuit at step 1010 before decrementing the least significant byte of the time count at step 1012. At step 1014 the least significant byte of the time count is tested and if it is not zero the program loops back to step 1004. The loop of instructions 1004–1014 is executed repeatedly until the least significant byte of the time count has been decremented to zero. At this point the program moves to step 1016 to decrement the most significant byte of the time count before testing it at step 1018. If the most significant byte of the time count has not been decremented to zero, the program branches back to step 1004 and executes steps 1004–1018 repeatedly until the test at step 1018 shows that the most significant byte of the incremental time count has been reduced to zero. The program then returns to FIG. 9C and at step 930 outputs a code through VIA 306 to turn off the twine tube drive motor before a jump is made back to the start of the Wrap Routine. At this time the sequence table pointer is pointing to the second code word of the sequence table, having been bumped at step 1000. The second code word (dwell) is tested at steps 902, 904 and 906 and since all of these tests prove false the most significant bits of the time count for the dwell code word are retrieved before a branch is made to the Time Delay subroutine to count out the time. Upon return from the Time Delay subroutine the program jumps back to the start of the Wrap Routine.

The third code word is read at step 900 and tested at steps 902, 904 and 906. Since the third code word contains the retract code, a branch is made from step 906 to FIG. 9D. The least significant byte of the incremental time count is saved at step 912 and at step 914 the microprocessor 300 outputs to the VIA 306 a code word which is placed on bus 292 to energize the retract relay K2. Relay K2 energizes motor 216 to move the twine tubes so as to retract them toward the home position. At step 916 the retract code is retrieved from the memory and the program again executes the Time Delay subroutine at step 918.

In FIG. 10, the Time Delay subroutine is executed as previously described with one exception. Since the Retract flag was set at step 912, the test at step 1004 proves false so that the program proceeds to step 1020 to test the Home Delay T.D. switch register. Under the assumed conditions the twine tubes are not in the home position so the program moves from step 1020 to step 1006 and continues as previously described.

After the Time Delay subroutine is executed a return is made to FIG. 9D where, at step 920, an output code is fed over bus 292 to deenergize relay K2 and stop the retraction of the twine tubes. The program then returns to step 900 of the Wrap Routine.

Assume now that when the Time Delay subroutine was last executed the sequence table pointer was bumped at step 1000 to address a code word which contains an Extend code. Upon return to the start of the Wrap Routine the Retract flag is cleared and the Wrap code is obtained and the most significant byte of the incremental time count saved. The program proceeds through step 902 and at step 904 the test shows that the control word contains an Extend code. The program branches to FIG. 9C where, at step 922 the least significant byte of the incremental time count is saved. At step 924 the microprocessor outputs through VIA 306 to bus 292 a code which energizes the extend relay K1 thereby energizing motor 216 to drive or extend the twine tubes away from the home position. At step 926 the code of the control word is retrieved before proceeding to step 928 where the Time Delay subroutine is executed as previously described. After the Time Delay subroutine is executed the program returns to FIG. 9C where, at step 930 the microprocessor outputs a code through VIA 306 to bus 292 to deenergize relay K1 and stop the movement of the twine tubes. The program then loops back to the beginning of the Wrap Routine.

If a control word is obtained from the sequence table and this control word contains the Home code, this fact is detected at step 902 and the program branches to FIG. 9B. At step 932 the microprocessor outputs through VIA 306 to bus 292 a code which energizes relay K2 to begin retracting the twine tubes toward the home position. A timer register is preset to some value before watch circuit 360 is pulsed at step 934. The program then enters a loop where a Wait For Interrupt is executed at step 936, the watch circuit is pulsed at step 938, the timer is decremented at step 940, the timer is tested at step 942 to see if it has timed out and the Home switch register is tested at step 944 to see if the twine tubes are in the home position.

The count which is preset into the timer at step 932 is sufficiently large so that the twine tubes are normally moved back to the home position before the timer times out. The loop of instructions 936–944 is executed until the test of the Home Position switch register at step 944 shows that the twine tubes are in the home position. The program moves to step 946 where the microprocessor outputs through VIA 306 to bus 292 a code which deenergizes the relay K2 and stops retraction of the twine tubes. After step 946 is executed the program returns to the Main Routine at step 742 (FIG. 7B).

If there should be some interference with the twine tubes so that the timer times out before the twine tubes are returned to the home position, this fact is detected at step 942 and the program branches to step 950 where the microprocessor outputs through VIA 306 to bus 292 a code to deenergize the retract relay K2. At step 952 the Full Bale Alarm On flag is set before the Wrap Routine jumps to step 700 of the Main Routine in FIG. 7A.

Once the program jumps to the start of the Main Routine it "hangs" by continuously executing the loop of operations comprising steps 700, 702, 782 and 784. The program can be freed from this loop only if the operator actuates the retract switch to energize the drive motor 216 and drive the twine tubes to the home position. When the twine tubes reach the home position, and after an NMI is executed to sense that the home position switch is actuated, then the test at step 702 will prove true and the microprocessor may resume its regular execution of the Main Routine. This insures that the twine tubes are always in the home position when a bale wrapping cycle is initiated.

Returning for the moment to FIG. 10, if the switch 108 should be set to the manual position during the wrap operation this condition will be detected at step 1006 and the program will branch to step 1030 to pulse the watch circuit 360. At step 1032 the Manual switch register is tested and since the switch 108 is set in the manual position the program branches back to step 1030. Steps 1030 and 1032 are executed until switch 108 is switched back to the auto position. At this time the microprocessor 300 stack pointer is incremented by three at step 1034 after which the sequence table starting address +2 is obtained at step 1036 before returning to step 920 of FIG. 9D. Thus, during execution of the wrap sequence the operator may select the manual mode by setting switch 108 to the manual position. When the switch is returned to the auto position the wrap sequence resumes operation at the first dwell, that is, the initial twine wrap position.

The Home Position T.D. switch register, like the Full Bale T.D. switch register, includes an indicator and a count portion. In FIG. 5A, on the first NMI after the twine tubes leave the home position the test at step 512 shows that the home position switch is not set. At step 560 a retract disable counter is preset and an output code is sent through VIA 306 to bus 292 to enable the retract relay K2 to be energized. The home position T.D. switch is reset with a predetermined count as an indicator that the twine tubes are not in the home position. The purpose of the time delay is to allow overtravel of the cam on the microswitch. From step 560 the NMI Routine proceeds in a manner which should now be obvious.

If the home position switch should close during the wrap operation, this fact is detected at step 512 of the next NMI and the program moves to step 514 to test the retract disable counter to see if it has been decremented to zero. If it has, the program moves to step 516 as previously described to deenergize the retract relay K2 and set the Home Position T.D. switch register.

Returning to FIG. 10, if the Home Position T.D. switch register should be set when step 1020 is performed the program branches to step 1040 where a code is placed on bus 292 to deenergize the retract relay K2. The stack pointer is then incremented by three before the program returns to the Wrap Routine which results in a return to the Main Routine.

From the foregoing description it is seen that the present invention provides a diagnostic means by which an operator with little or no electronic skills may locate an electrical problem in a piece of microprocessor controlled farm equipment by operating switches and selectively shorting certain circuit locations as instructed by an operator's manual provided with the baler. With the use of a voltmeter even more circuit components may be tested. An exemplary "operator's manual" is provided below which indicates (1) normal operation of the alarm and indicators (2) the operator initiated testing procedure and (3) a trouble shooting procedure for the automatic baling machine described above.

ALARM AND INDICATOR OPERATION

1. Normal operation of auto-wrap
  a. Turn power on ("manual-auto-learn" switch in any position)
    1. All lamps on for ½ sec., then off
  b. Place "manual-auto-learn" switch in "auto" position
    1. Ready lamp (green) on
    2. Alarm on for ½ sec., then off Note: twine tubes must be in home position and tailgate must be latched for ready lamp to turn on
  c. Full bale switch activated
    1. Ready lamp (green) off
    2. Full bale lamp (red) on
    3. Alarm on for 3 sec., then off
    4. Sequence continues at d.1
  or
  c. Tie switch activated
    1. Ready lamp (green) off
    2. Full bale lamp (red) on
    3. Sequence continues at d.1
  d. Wrap sequence starts 1. Wrap sequence completed
2. Full bale lamp (red) off
3. Eject lamp (amber) on
4. Alarm on for ½ sec., then off
e. Operator opens tailgate
 1. Eject lamp (amber) off
or
e. Tie switch activated
 1. Eject lamp (amber) off
 2. Full bale lamp (red) on
 3. Sequence continues at d.1
f. Operator closes tailgate
 1. Sequence continues at b.1

TESTING PROCEDURE

2. Operator Initiated Self Test
 a. Turn power off
 b. Depress and hold "tie" switch
 c. Turn power on
 d. Release "tie" switch
  1. Ready lamp (green) on for 1.5 sec., then off
  2. Full bale lamp (red) on for 1.5 sec., then off
  3. Eject lamp (amber) on for 1.5 sec., then off
  4. Alarm on for ½ sec., then off
 e. Operator changes any switch position
  1. Alarm pulsed for ½ sec.
  2. Continue at e.
3. Trouble shooting procedures
Search list below for fault condition and follow prescribed procedure (Box referred to is one containing microprocessor and other electronic circuits)
 a. Ready lamp (green) and alarm do not come on when power turned on.
  1. Perform self-test procedure as listed in section 2.
   a. Ready lamp (green) comes on during self test?
    Yes: go to a.1.b
    No: go to a.6
   b. Alarm comes on during self test?
    Yes: go to a.2
    No: go to a.7
  2. Check twine tubes home switch (refer to self test procedure in section 2) Note: verify alarm ok
   a. Alarm pulsed with each opening and closing of switch
    Yes: go to a.3
    No: go to a.8
  3. Check twine tubes in home position
   a. Switch mechanically depressed
    Yes: go to a.4
    No: adjust switch; end
  4. Check tailgate SW. (Refer to self test procedure in section 2) Note: verify alarm ok.
   a. Alarm pulsed with each opening and closing of switch
    Yes: go to a.5
    No: Go to a.8a
  5. Check tailgate in closed position.
   a. Switch mechanically depressed
    Yes: replace box; end
    No: adjust switch; end
  6. Check if other lamps come on during self-test. (Refer to self-test procedure in section 2)
   a. Lamps come on?
    Yes: replace ready lamp (green); end
    No: Go to a.9
  7. Check if lamps come during self-test. (Refer to self-test procedure in section 2)
   a. Lamps come on?
    Yes: Replace box; end
    No: Go to a.9
  8. Remove wires at SW. terminals. Alternately short and open wires.
   a. Alarm pulsed with each opening and shorting of wires.
    Yes: replace switch; end
    No: Go to a.13
  8a. Remove wires at SW. terminals. Alternately short and open wires.
   a. Alarm pulsed with each opening and shorting of wires.
    Yes: replace switch; end
    No: Go to a.14
  9. Check fuse
   a. Fuse ok?
    Yes: Go to a.10
    No: Replace fuse; end
  10. Check for +11 volts at terminal "A" of 30A circuit breaker
   a. Voltage level ok?
    Yes: Go to a.15
    No: Go to a.11
  11. Check for +11 volts at terminal "B" of 30A circuit breaker
   a. Voltage level ok?
    Yes: replace circuit breaker
    No: Go to a.12
  12. Check for +11 volts at "+" battery
   a. Voltage level ok?
    Yes: replace wire from circuit breaker "B" terminal to battery; end
    No: Check tractor electrical system; end
  13. Disconnect break-away connector. Alternately open and short pins D4 and D1
   a. Alarm pulsed with each opening and shorting of pins
    Yes: replace or repair machine harness; end
    No: replace box; end
  14. Disconnect break-away connector. Alternately open and short pins D-1 and D-2
   a. Alarm pulsed with each opening and shorting of pins.
    Yes: replace or repair machine harness; end
    No: replace box; end
  15. Check ground connection to tractor frame
   a. Connection ok?
    Yes: replace box; end
    No: repair connection; end

LAMP PROBLEM b. All lamps on
 1. Go to section 3.a.10
c. Full bale lamp (red) does not come on when wrapping
 1. Perform self test procedure as listed in section 2
  a. Full bale lamp (red) comes on during self test?
Yes: N/A
No: replace bulb; end
d. Eject lamp (amber) does not come on after wrap sequence complete
 1. Perform self-test procedure as listed in section 2.
  a. Eject lamp (amber) comes on during self test?
   Yes: N/A
   No: replace bulb; end
e. Any one lamp remains on all the time and controller functions normally
 1. Perform self-test procedure as listed in section 2.

a. Lamp remains on all the time during self-test
Yes: replace box; end
No: N/A

ALARM PROBLEM f. Alarm does not come on as described in section 3 (normal operation) and controller functions normally
1. Perform self-test procedure as listed in section 2.
   a. Alarm comes on during self-test
   Yes: N/A
   No: replace box; end
g. Alarm remains on all the time and controller functions normally
1. Perform self-test procedure as listed in section 2.
   a. Alarm remains on all the time during self-test
   Yes: replace box; end
   No: N/A

TWINE TUBE DRIVE MOTOR PROBLEM h. Twine tube drive motor on constantly when power turned on
1. Hear relays clicking in response to "extend-retract" switch?
   a. Yes; replace box; end
   b. No; replace relay(s); end
j Twine tubes do not extend as described in section 1 (normal operation) but can be extended using the "extend-retract" switch
1. Replace box; end
k. Twine tubes do not extend as described in section 1 (normal operation) and cannot be extended using front panel switch.
1. Hold extend switch depressed. Check for +11 V between blades at twine tube motor connector P2-1 and P2-2
   a. +11 V present across pins?
   Yes: replace twine tube drive motor; end
   No: go to k.2
2. Disconnect break-away connector. Measure voltage between pin D-5 and pin D-6
   a. +11 V present across pins
   Yes: replace machine harness
   No: Go to k.2
3. Hear relays clicking in response to "extend-retract" switch? Replace relays
   Yes: end
   No: replace box; end The embodiments of the invention in which an exclusive property or privilege is claimed are defined as follows:

1. In an automatic baling machine having a plurality of input switches, a signal processing circuit, and a plurality of output indicators, the improvement wherein said signal processing circuit comprises:
a microprocessor;
a memory means;
an interface adapter having input terminals connected to said input switches and output terminals connected to said output indicators;
bus means interconnecting said microprocessor, said memory means and said interface adapter;
said microprocessor normally executing a program in said memory means to sample said input terminals and selectively apply output signals to said interface adapter output terminals;
said microprocessor being responsive to actuation of a predetermined one of said input switches during the time power is turned on for executing a diagnostic program; and,
a twine tube motor control circuit connected to output terminals of said interface adapter for selectively moving the twine tubes of the automatic baling machine,
said microprocessor being responsive to actuation of said predetermined input switch at some time after power is turned on for selectively transmitting signals through said interface adapter to said twine tube motor control circuit to control the wrapping of a bale if a second of said input switches has been actuated to indicate that a full bale has been formed.

2. The improvement as claimed in claim 1 wherein during execution of said diagnostic program said microprocessor is responsive to actuation of any one of said input switches for actuating a single predetermined one of said output indicators for a predetermined interval of time each time any one of said input switches is operated.

3. The improvement as claimed in claim 2 wherein said predetermined one of said output indicators is an audible alarm.

4. A method for diagnosing problems in an automatic baling machine of the type including a microprocessor controlled signal processing circuit responsive to selective actuation of input switches for selectively controlling output indicators, said mircroprocessor controlled signal processing circuit including a memory storing a program which is normally executed to selectively control said output indicators if a first of said input switches is not actuated at the time power is turned on, said method comprising:
storing in said memory a diagnostic program for normally actuating a predetermined one of said output indicators each time any one of said input switches is actuated; and,
executing said diagnostic program only if a predetermined one of said input switches is actuated during the time power is turned on.

5. The method as claimed in claim 4 wherein said predetermined output indicator is an audible alarm, whereby an audible signal is generated each time any one of said input switches is actuated if said any one actuated switch is in operating condition.

6. The method as claimed in claim 5 wherein said audible signal is generated only for a limited interval of time after actuation of said any one input switch if said any one actuated switch is in operating condition.

7. The method as claimed in claim 5 wherein a manual of test procedures is provided which defines a sequence of test steps to be followed in the event said baling machine does not operate properly, said set of test procedures defining individual manually effected test steps each of which will result in an audible or visual indication of success or failure of the test step.

8. The method as claimed in claim 5 wherein all of said indicators except said audible alarm is a visual indicator and all of said output indicators are actuated in turn when said diagnostic program is initiated to visually indicate to an operator that said output indicators are operating.

9. In a baling machine having motor means providing power to drive elements of said baling machine to perform at least one operation during a baling cycle, the improvement comprising:

a first plurality of switches manually operable by an operator to produce output signals for controlling operation of said baling machine;

a second plurality of switches for sensing events occurring during a baling cycle and produced output signals indicating said events;

a plurality of output indicators for indicating to an operator the progress of a baling cycle and operations to be performed by him;

memory means;

an interface adapter having input terminals connected to said first and said second plurality of switches for receiving said output signals and output terminals connected to said output indicators and said motor means;

a microprocessor;

memory means for storing a program;

bus means interconnecting said microprocessor, said memory means and said interface adapter;

said microprocessor being normally responsive to said program to sample said input terminals and selectively apply output signals to said interface output terminals to energize said motor means and indicate to the operator the progress of a baling cycle;

a diagnostic program stored in said memory means;

said microprocessor being responsive to actuation of one switch of said first plurality of switches to initiate execution of said diagnostic routine to successively actuate said indicators sequentially, each indicator being actuated for a predetermined period of time.

10. The improvement as claimed in claim 9 wherein said microprocessor, in executing said diagnostic routine, repeatedly samples the output signals produced by said second plurality of switches and produces an output signal to actuate a predetermined one of said indicators if any switch of said second plurality of switches is manually actuated, whereby said switches in said second plurality of switches may be tested in any sequence.

11. The improvement as claimed in claim 10 wherein said predetermined indicator is an audible indicator.

12. The improvement as claimed in claim 10 wherein said microprocessor produces output signals to actuate each of said indicators when it begins execution of said diagnostic routine whereby the operability of each of said indicators may be verified before they are utilized to indicate the operabililty of the switches in said second plurality of switches.

13. The improvement as claimed in claim 9 wherein said microprocessor is responsive to actuation of said one switch subsequent to power turn-on for energizing said motor when said processor is executing said program.

14. The improvement as claimed in claim 13 wherein said microprocessor is responsive to said one switch to initiate execution of said diagnostic routine only if said one switch is actuated before and at the time power is applied to said microprocessor.

* * * * *